(12) United States Patent
Nieuwoudt et al.

(10) Patent No.: US 11,724,211 B2
(45) Date of Patent: Aug. 15, 2023

(54) CONTACT TRAY FOR A MASS TRANSFER COLUMN

(71) Applicant: KOCH-GLITSCH, LP, Wichita, KS (US)

(72) Inventors: Izak Nieuwoudt, Wichita, KS (US); Charles Griesel, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 17/828,828

(22) Filed: May 31, 2022

(65) Prior Publication Data

US 2022/0295321 A1 Sep. 15, 2022

Related U.S. Application Data

(62) Division of application No. 16/225,408, filed on Dec. 19, 2018, now Pat. No. 11,364,451.

(Continued)

(51) Int. Cl.
  *B01D 3/16* (2006.01)
  *B01D 3/32* (2006.01)
  (Continued)

(52) U.S. Cl.
  CPC .............. *B01D 3/163* (2013.01); *B01D 3/324* (2013.01); *B01F 23/232312* (2022.01); *B01J 19/32* (2013.01); *F28C 3/06* (2013.01); *H04B 17/24* (2015.01); *H04B 17/309* (2015.01); *H04B 17/318* (2015.01); *H04B 17/382* (2015.01); *H04L 5/0048* (2013.01); *H04W 16/14* (2013.01); *H04W 24/08* (2013.01); *H04W 24/10* (2013.01); *H04W 72/0453* (2013.01); *H04W 72/542* (2023.01); *H04W 76/27* (2018.02);
  (Continued)

(58) Field of Classification Search
  None
  See application file for complete search history.

(56) References Cited

U.S. PATENT DOCUMENTS 3,770,255 A 11/1973 Nutter
3,815,880 A 6/1974 Price
(Continued)

FOREIGN PATENT DOCUMENTS

| AR | 041479 A1 | 5/2005 |
| AR | 044053 A1 | 8/2005 |

(Continued)

OTHER PUBLICATIONS

First Examination Report received for IN application No. 202047031128, dated Jan. 27, 2022, 7 pages.

(Continued)

*Primary Examiner* — Adolf Dsouza

(57) ABSTRACT

A contact tray has a tray deck for receiving a liquid stream and a plurality of valves distributed across the tray deck through which vapor ascends for interacting with the liquid stream. Each valve includes an opening in the tray deck, wall segments that extend upwardly along opposite sides of the opening, and a valve body. The valve body has a trapezoidal valve cover positioned in covering relationship above and extending outwardly beyond the opening and legs that are attached to the valve cover at recesses located at opposite ends of the valve cover. A vent is positioned in one of the legs.

12 Claims, 43 Drawing Sheets

Related U.S. Application Data

(60) Provisional application No. 62/610,815, filed on Dec. 27, 2017.

(51) Int. Cl.

| | | |
|---|---|---|
| *F28C 3/06* | (2006.01) | |
| *B01J 19/32* | (2006.01) | |
| *B01F 23/232* | (2022.01) | |
| *H04B 17/24* | (2015.01) | |
| *H04B 17/309* | (2015.01) | |
| *H04B 17/318* | (2015.01) | |
| *H04B 17/382* | (2015.01) | |
| *H04W 76/27* | (2018.01) | |
| *H04L 5/00* | (2006.01) | |
| *H04W 16/14* | (2009.01) | |
| *H04W 24/08* | (2009.01) | |
| *H04W 24/10* | (2009.01) | |
| *H04W 72/0453* | (2023.01) | |
| *H04W 88/02* | (2009.01) | |
| *H04W 88/10* | (2009.01) | |
| *H04W 72/542* | (2023.01) | |
| *H04W 88/06* | (2009.01) | |

(52) U.S. Cl.
CPC ........... *H04W 88/02* (2013.01); *H04W 88/10* (2013.01); *H04W 88/06* (2013.01)

(56) References Cited

U.S. PATENT DOCUMENTS

| | | | |
|---|---|---|---|
| 3,862,281 A | 1/1975 | Uchiyama | |
| 4,698,138 A | 10/1987 | Silvey | |
| 5,914,012 A | 6/1999 | Kaibel | |
| 6,053,485 A | 4/2000 | Pan et al. | |
| 6,270,062 B1 | 8/2001 | Chueang et al. | |
| 6,422,539 B1 | 7/2002 | Burton et al. | |
| 6,830,607 B2 | 12/2004 | Allen et al. | |
| 7,604,222 B2 | 10/2009 | Zone | |
| 8,083,901 B2 | 12/2011 | Sharma | |
| 8,430,380 B2 | 4/2013 | Binkley et al. | |
| 8,720,870 B2 | 5/2014 | Pilling et al. | |
| 8,876,088 B1* | 11/2014 | Binkley | B01D 3/163 261/114.4 |
| 8,944,419 B2 | 2/2015 | Pilling et al. | |
| 8,968,524 B2 | 3/2015 | Del Corso | |
| 9,027,911 B2* | 5/2015 | Lehner | B01D 3/163 261/114.3 |
| 9,199,206 B2 | 12/2015 | Pilling et al. | |
| D816,188 S | 4/2018 | Armbrister et al. | |
| D816,189 S | 4/2018 | Nieuwoudt | |
| 2005/0280169 A1 | 12/2005 | Yao et al. | |
| 2007/0023938 A1 | 2/2007 | Fischer et al. | |
| 2008/0018003 A1* | 1/2008 | Pilling | B01D 3/163 261/114.3 |
| 2011/0278745 A1 | 11/2011 | Pilling et al. | |
| 2013/0062793 A1* | 3/2013 | Pilling | B01D 3/163 261/114.5 |
| 2017/0007971 A1 | 1/2017 | Nieuwoudt et al. | |

FOREIGN PATENT DOCUMENTS

| | | |
|---|---|---|
| CN | 1772328 A | 5/2006 |
| CN | 2810713 Y | 8/2006 |
| IN | 2312/DEL/2008 | 8/2010 |
| JP | 4895373 A | 12/1973 |
| JP | 3812512 B2 | 8/2006 |
| JP | 4028645 B2 | 12/2007 |
| KR | 20000005244 A | 1/2000 |
| KR | 101709754 B1 | 2/2017 |
| RU | 1464327 A1 | 6/1996 |
| RU | 2085246 C1 | 7/1997 |
| RU | 2331453 C2 | 8/2008 |
| RU | 2481875 C2 | 5/2013 |
| RU | 2602149 C2 | 11/2016 |
| WO | 2011141301 A2 | 11/2011 |

OTHER PUBLICATIONS

First Office Action and Search Report received for CN application No. 201880083944.6, dated Aug. 4, 2021, 17 pages (8 pages of English translation and 9 pages of Official copy).

International Preliminary Report on Patentability received for PCT Application No. PCT/IB2018/060379, dated Jul. 9, 2020, 13 Pages.

International Search Report and Written Opinion received for PCT Application No. PCT/IB2018/060379, dated Apr. 3, 2019, 16 Pages.

Kaibel et al."Unfixed Dividing Wall Technology for Packed and Tray Distillation Columns", Institution of Chemical Engineers, Symposium Series No. 152, 2006, 09 Pages.

Notice of Allowance received for U.S. Appl. No. 16/225,408, dated Feb. 23, 2022, 14 Pages.

Restriction Requirement received for U.S. Appl. No. 29/674,081, dated Apr. 8, 2020, 07 Pages.

\* cited by examiner

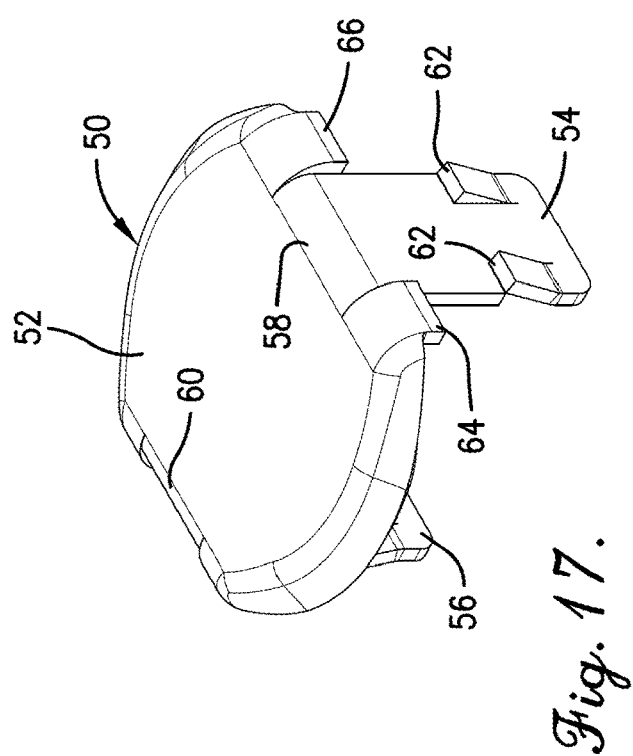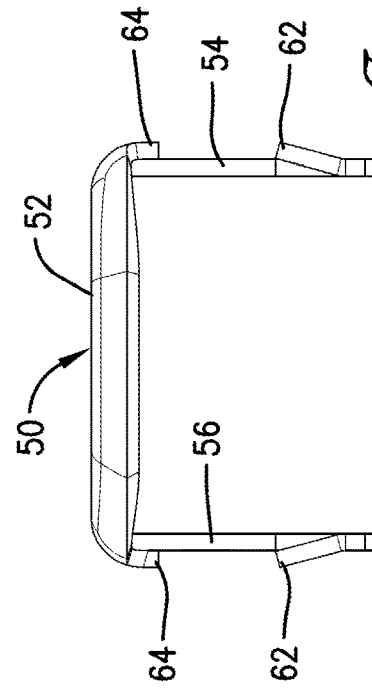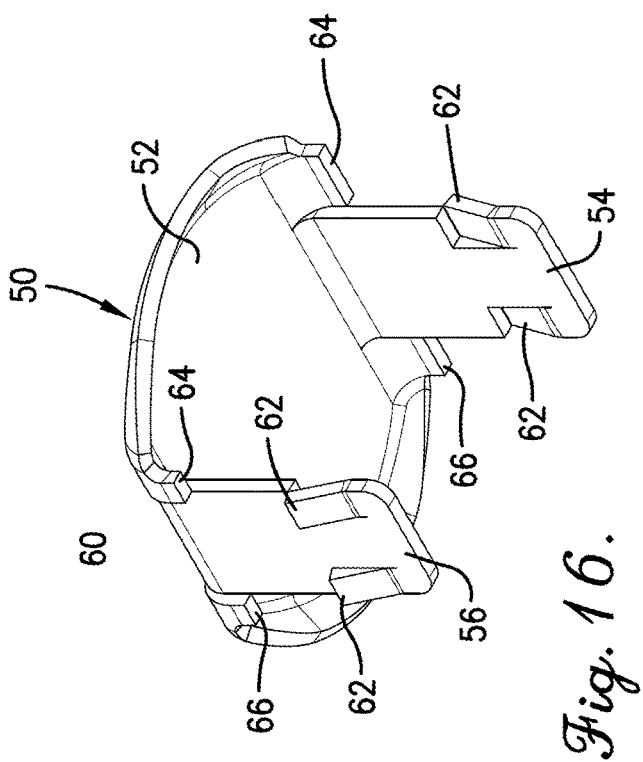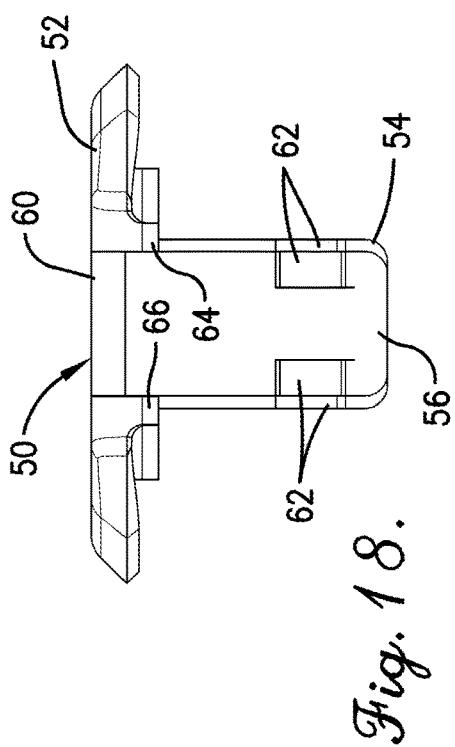

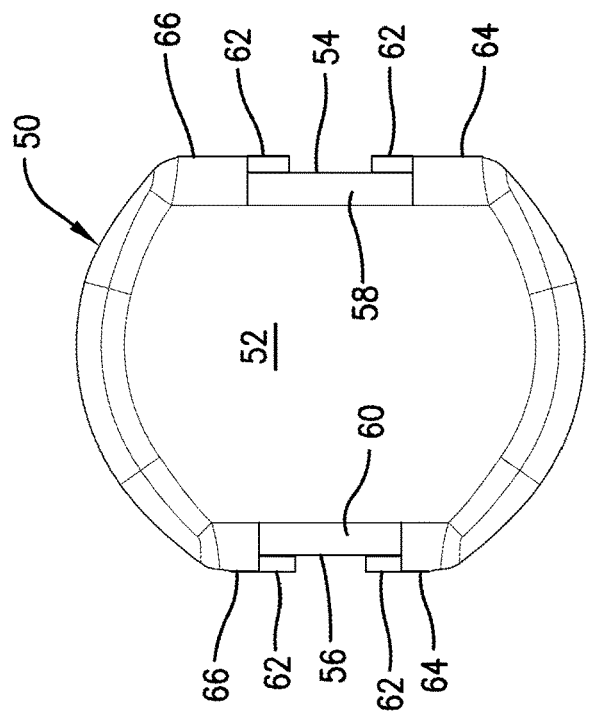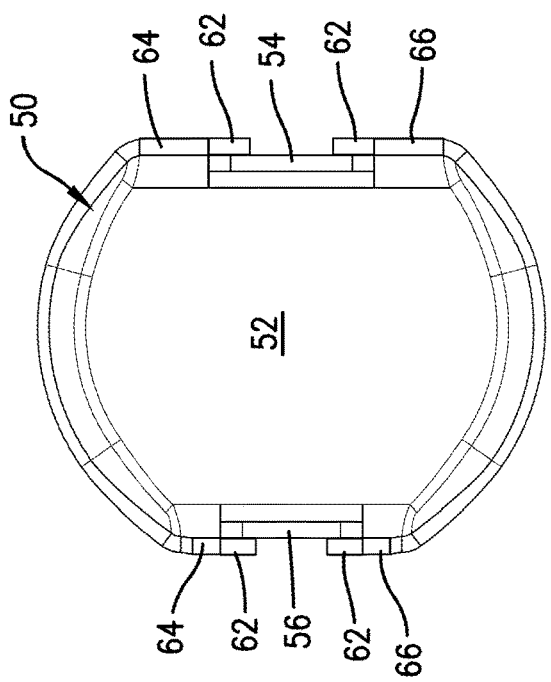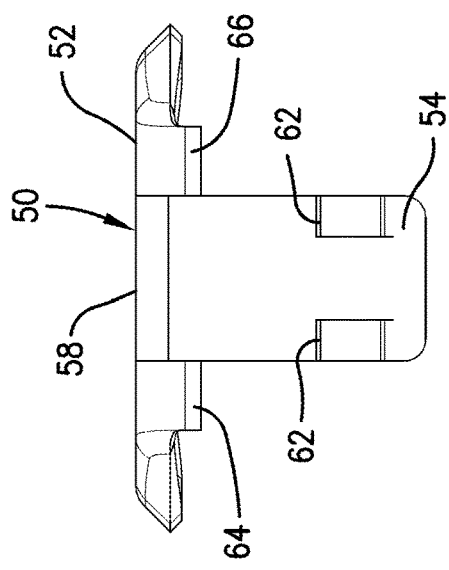

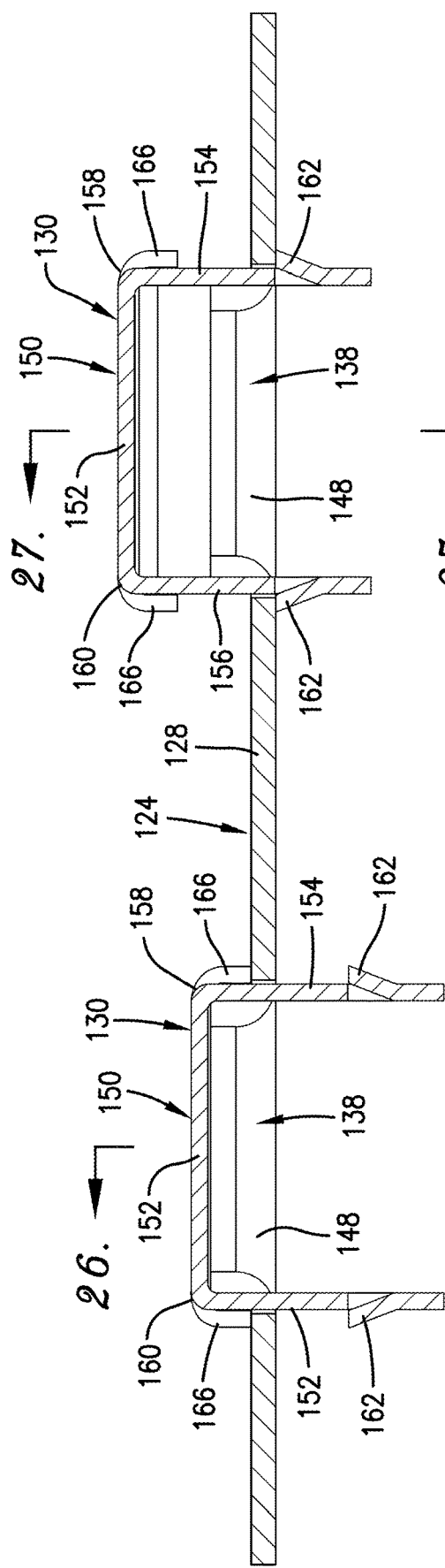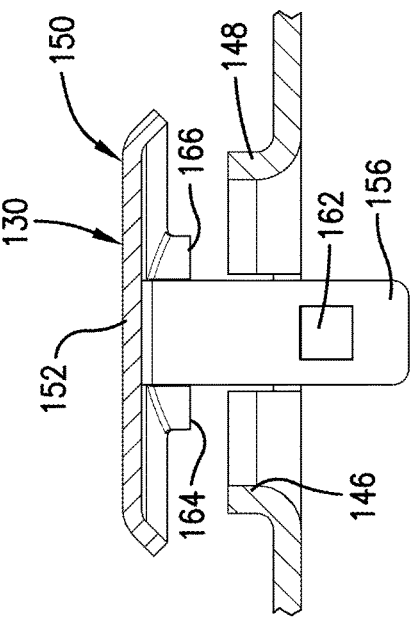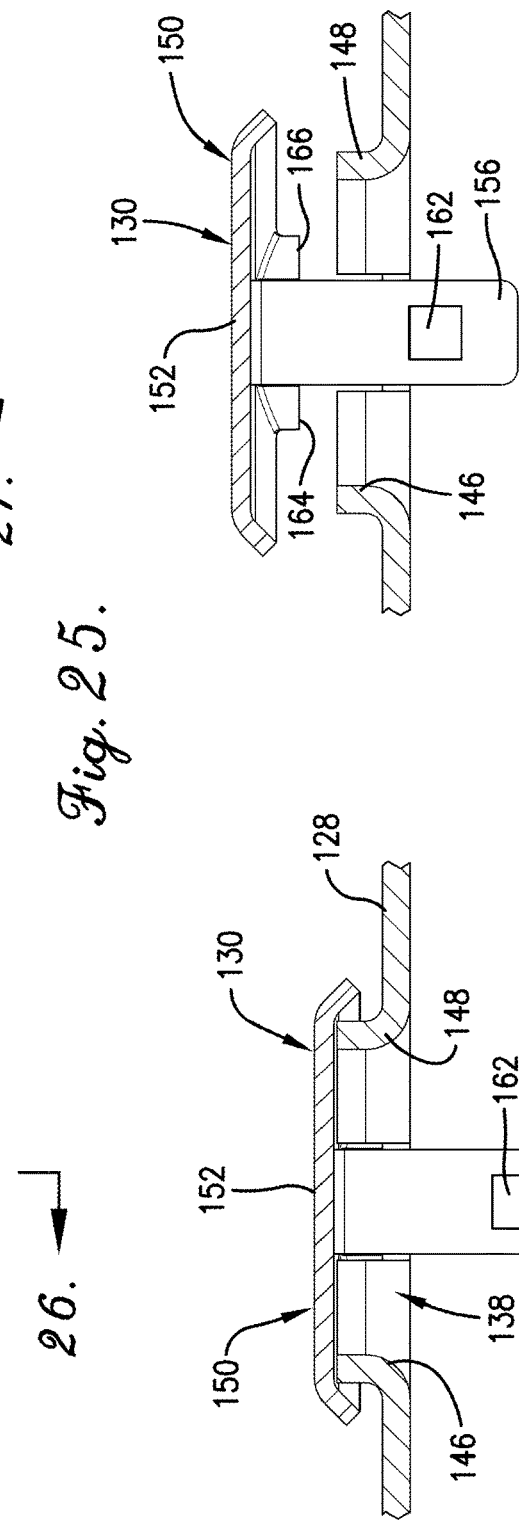

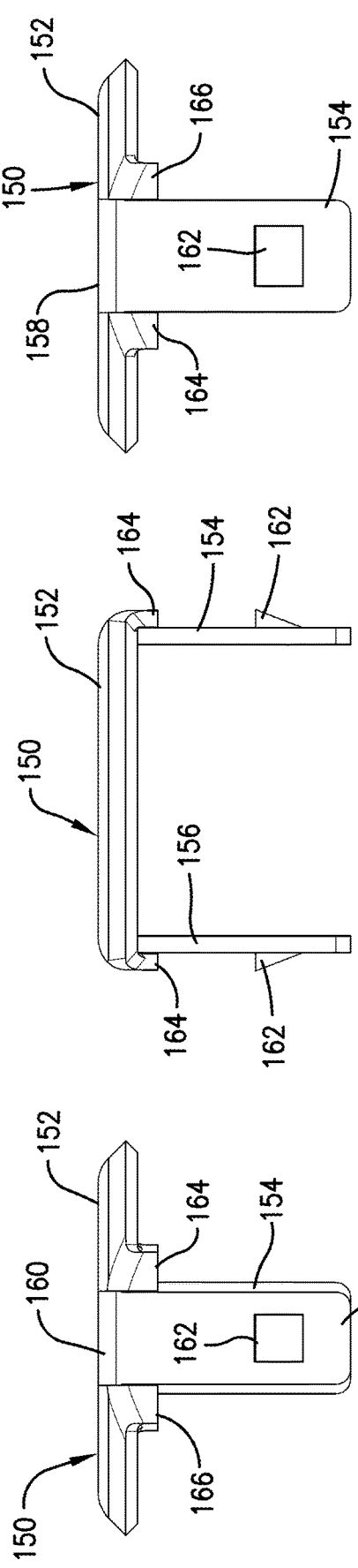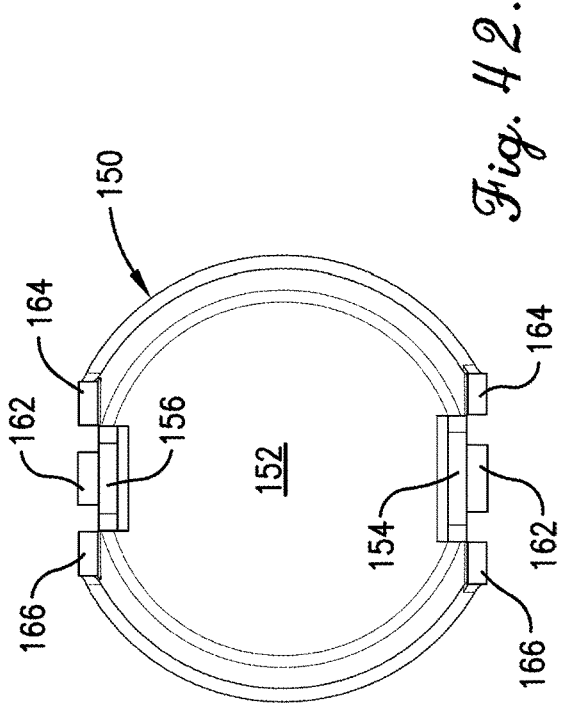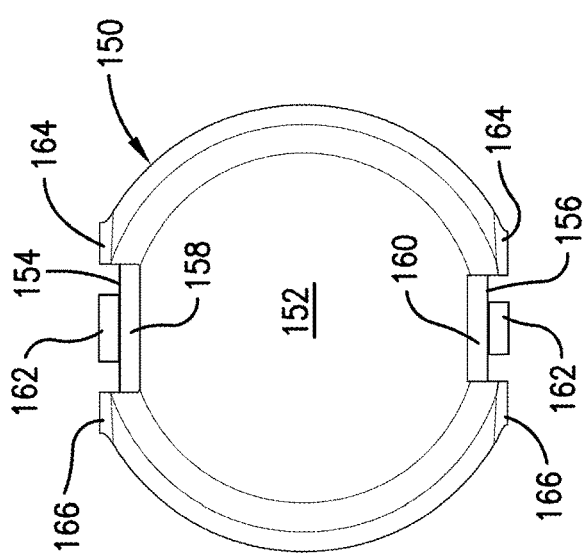

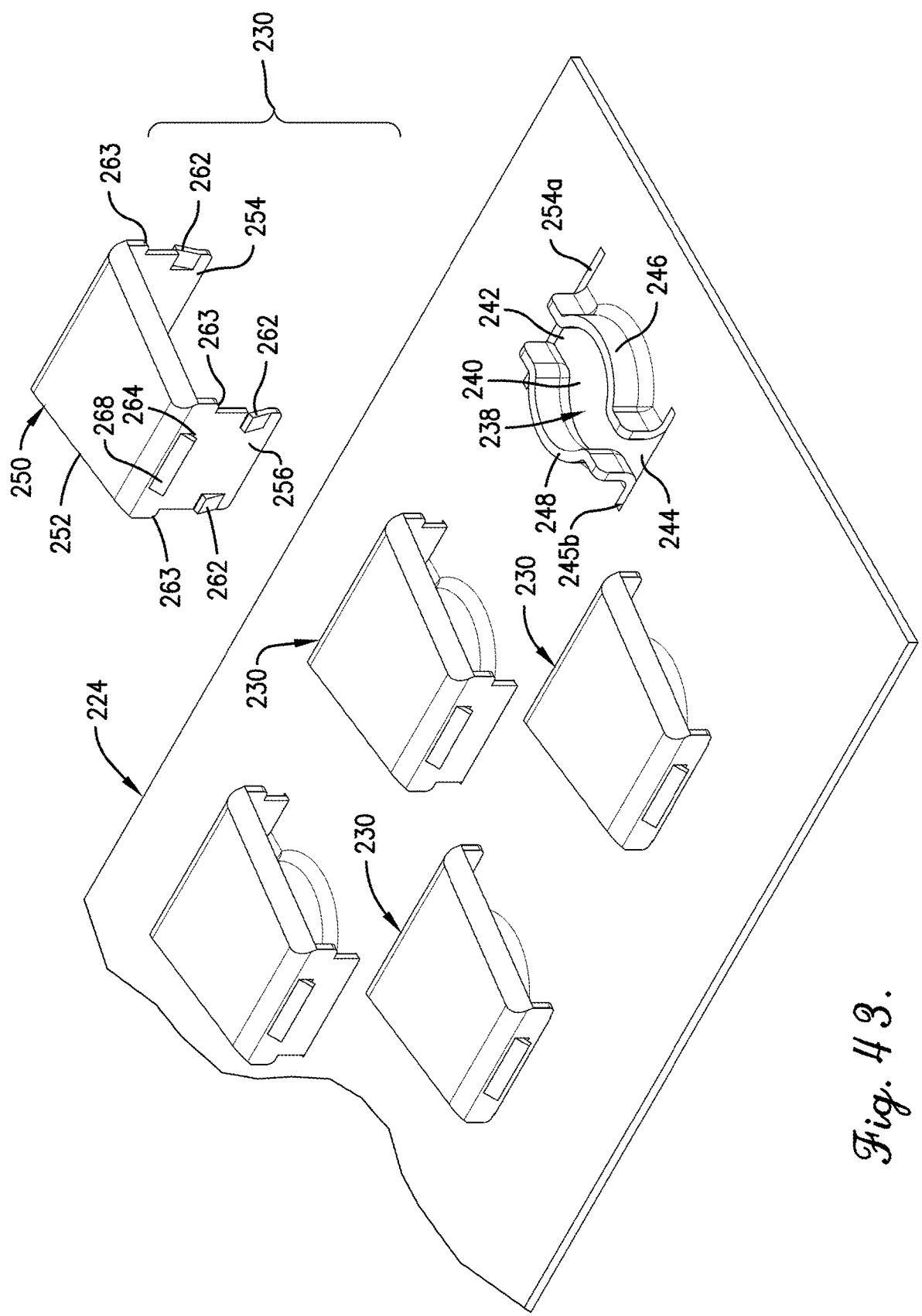

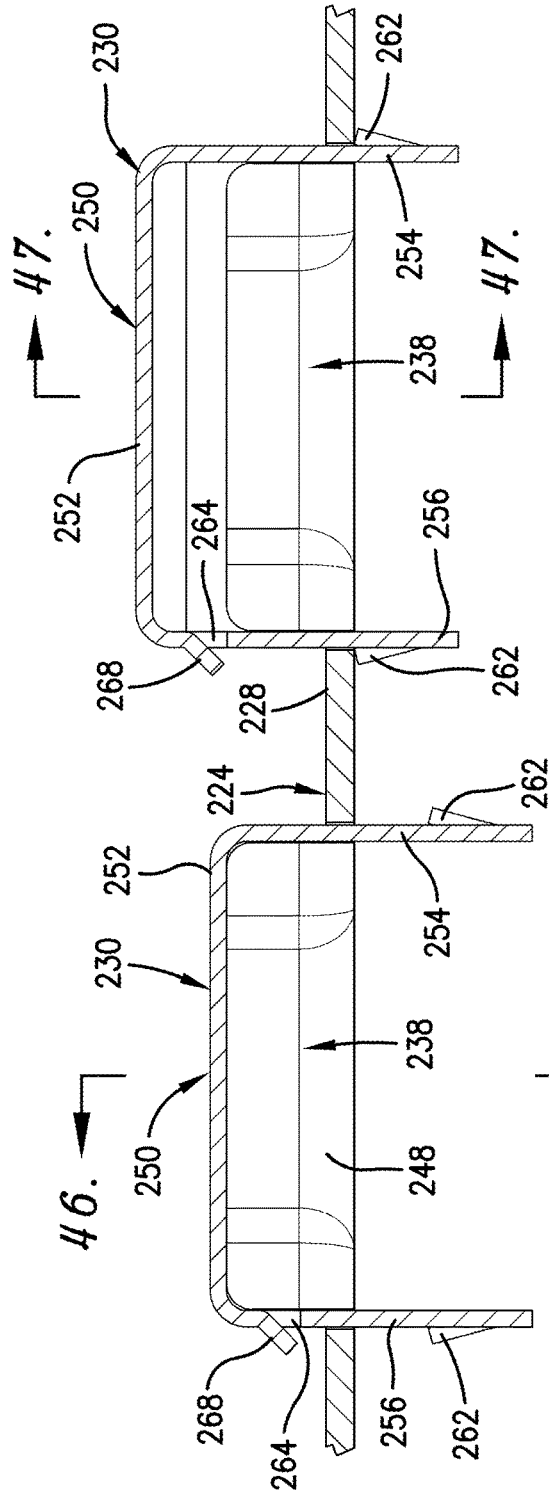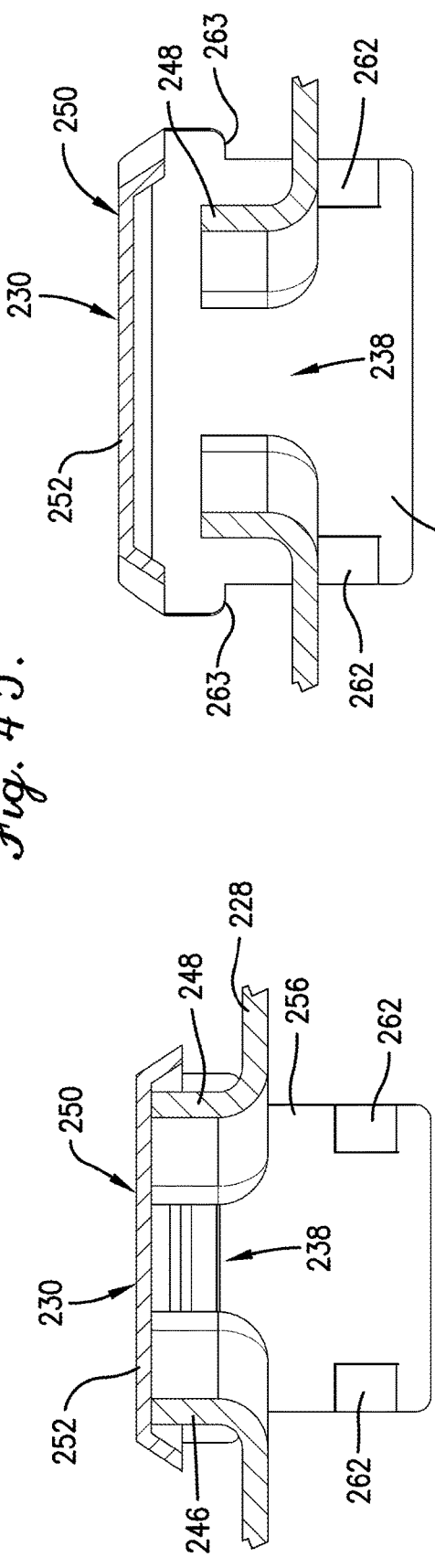

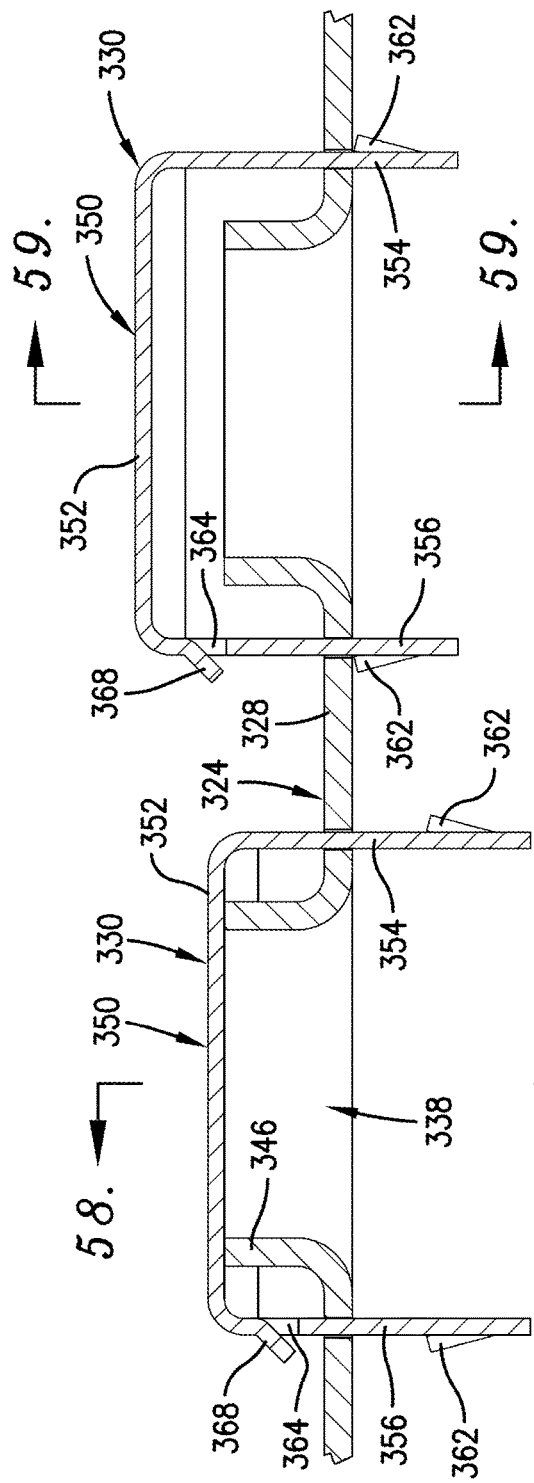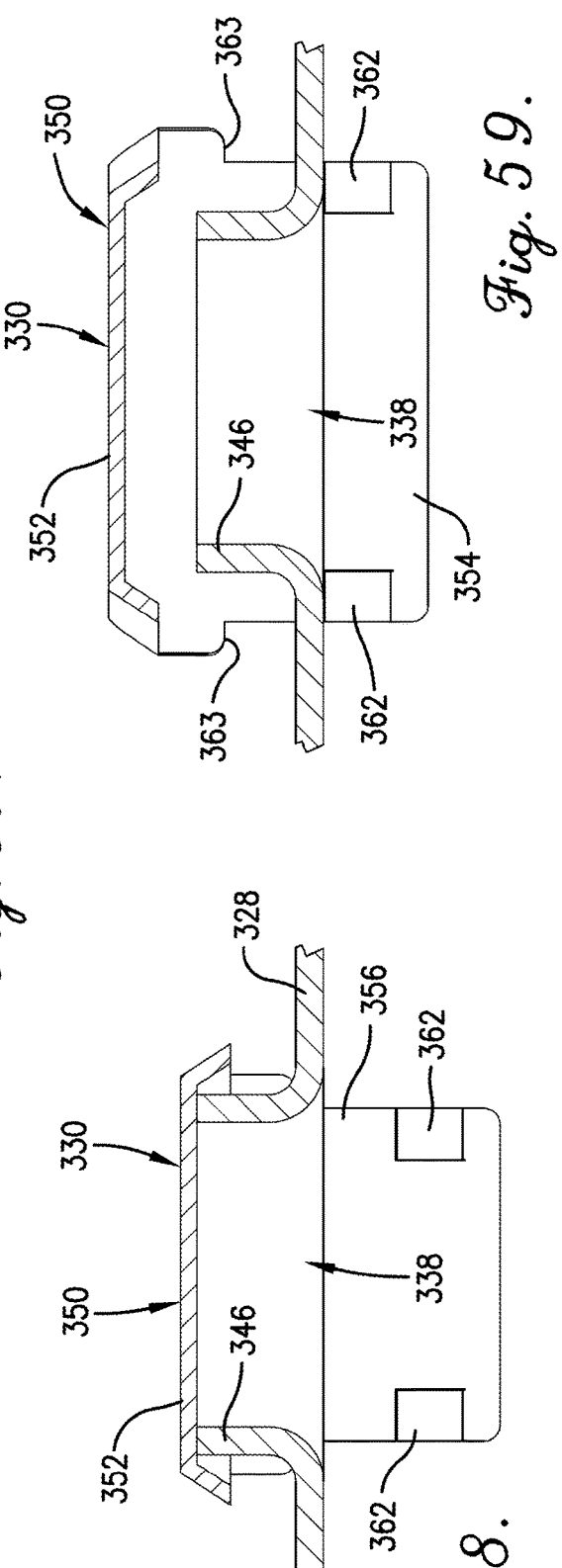

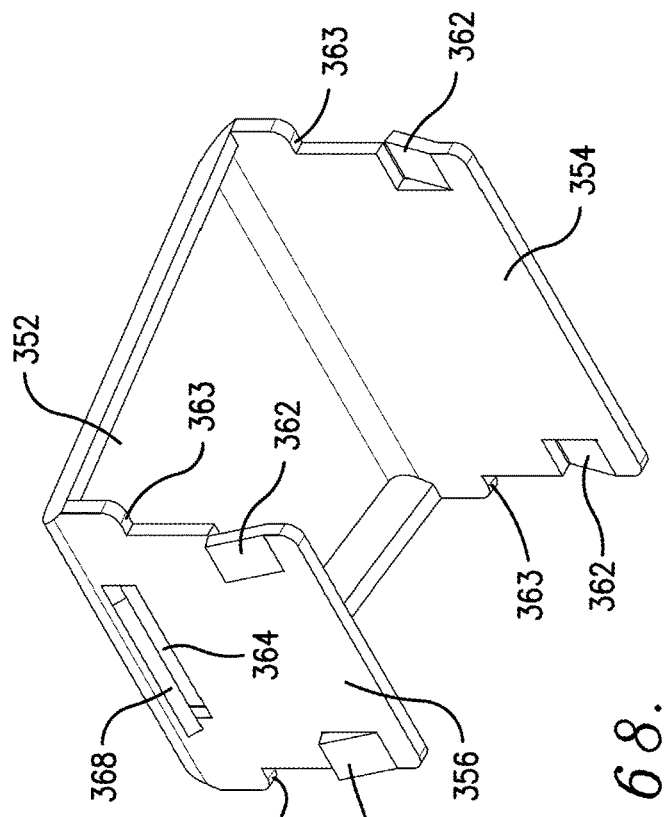
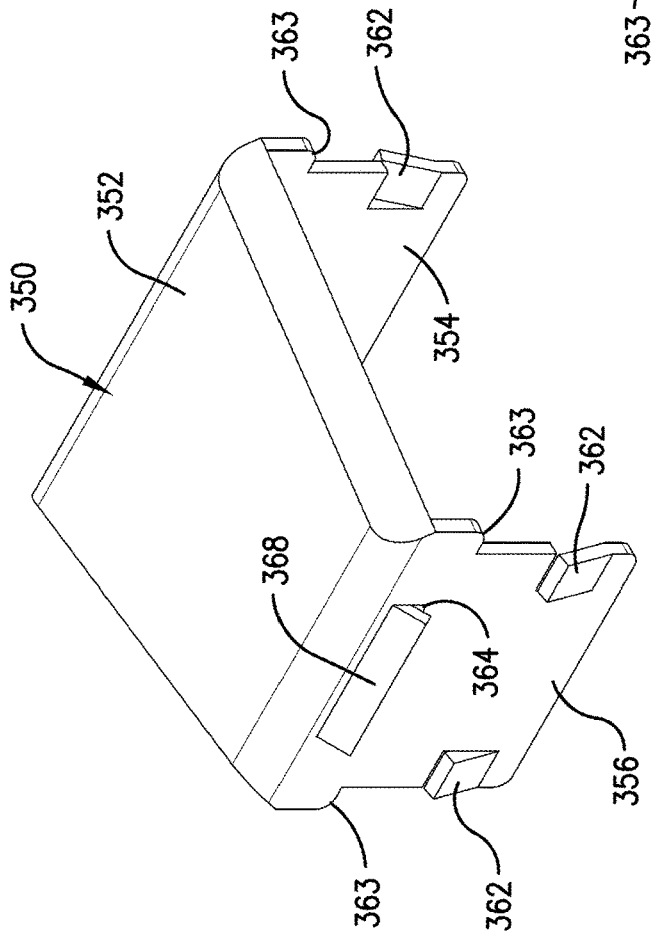

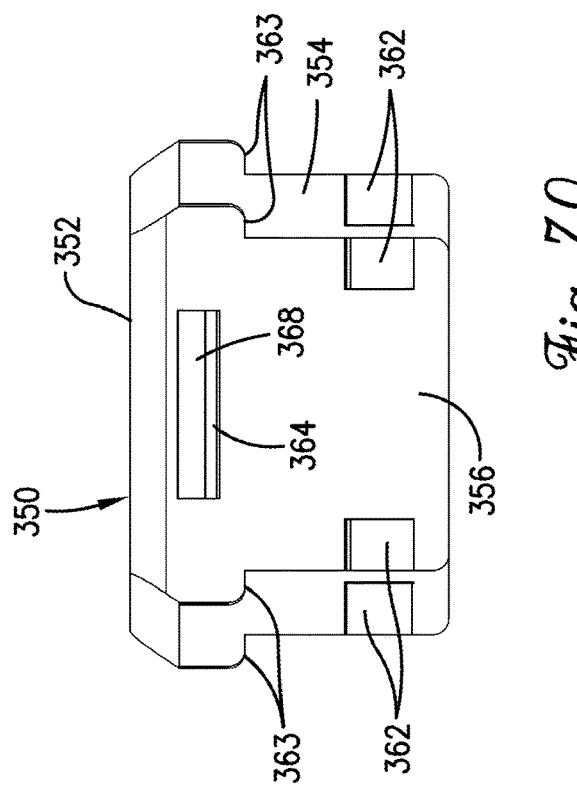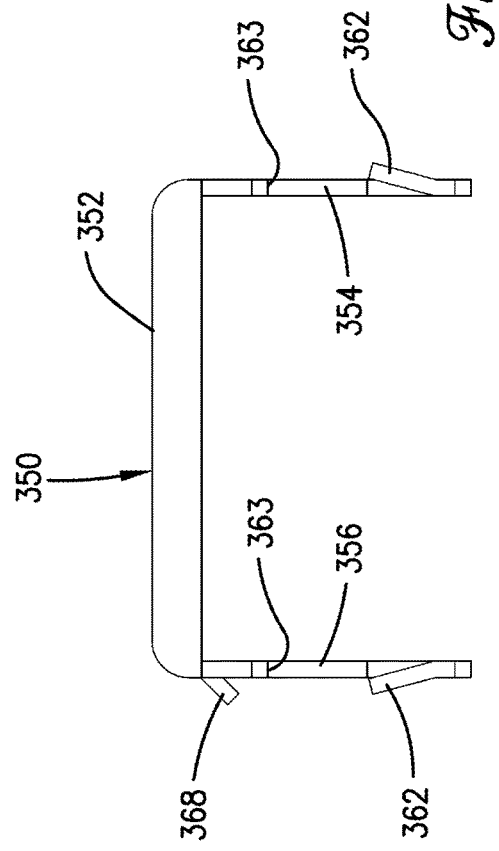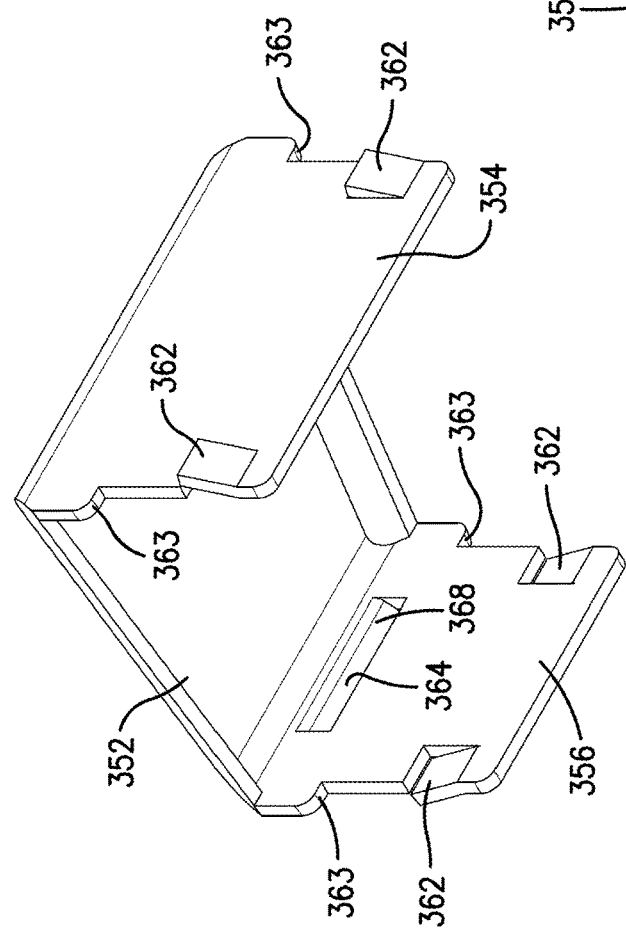

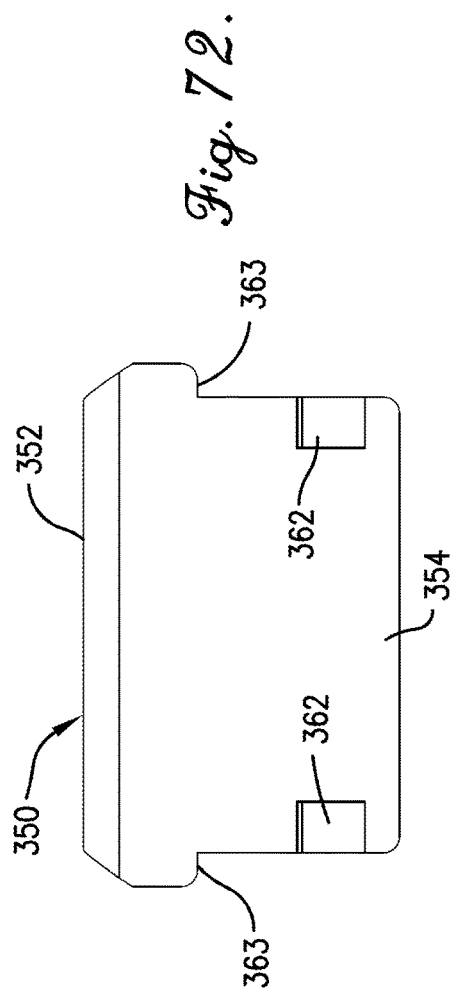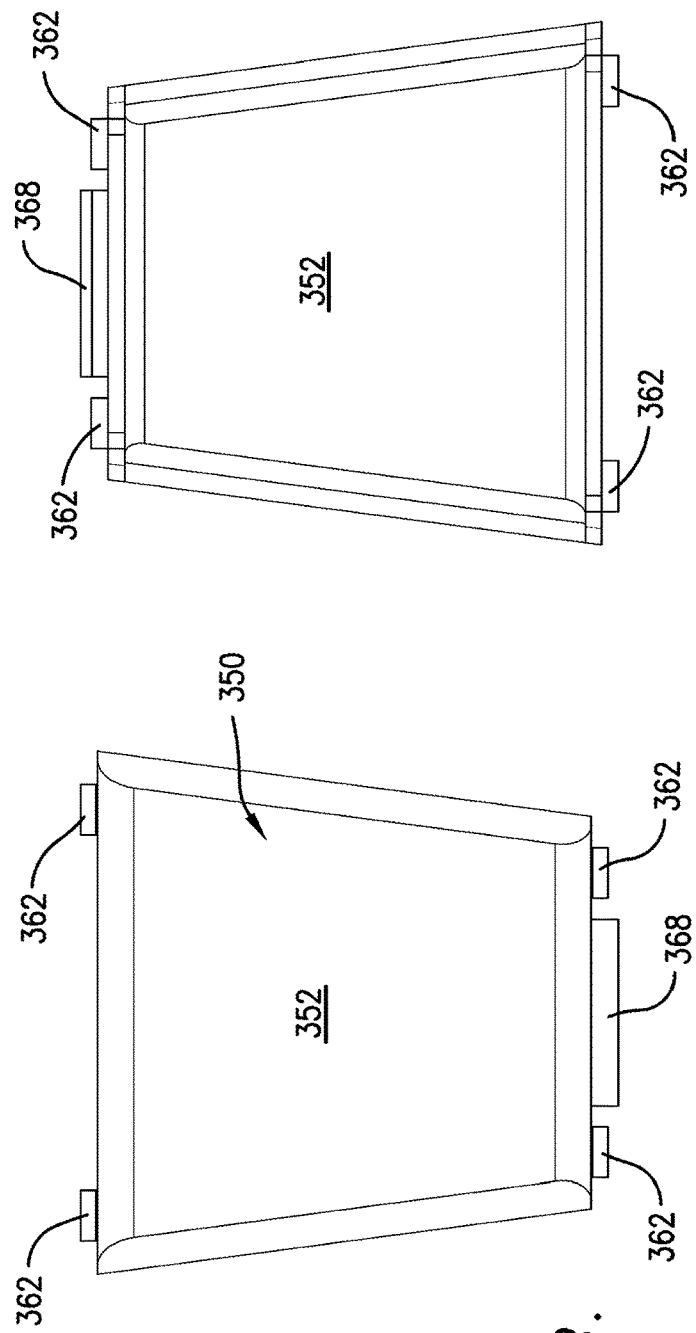

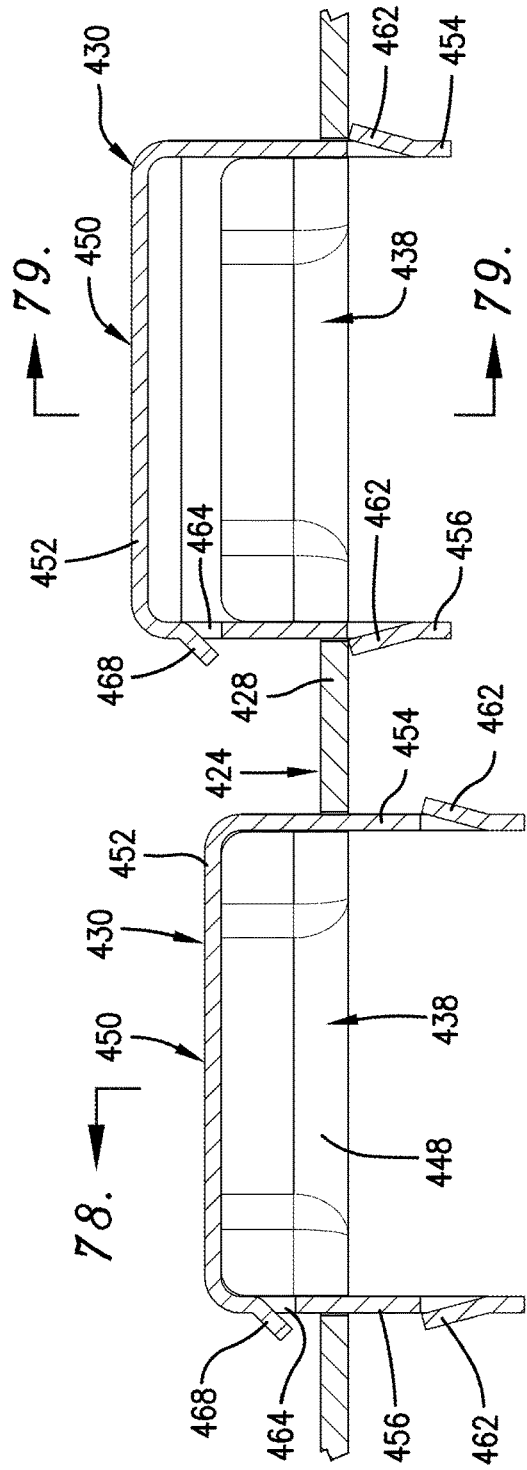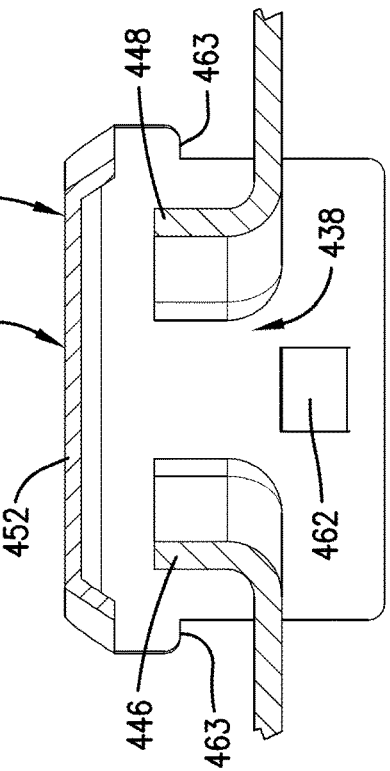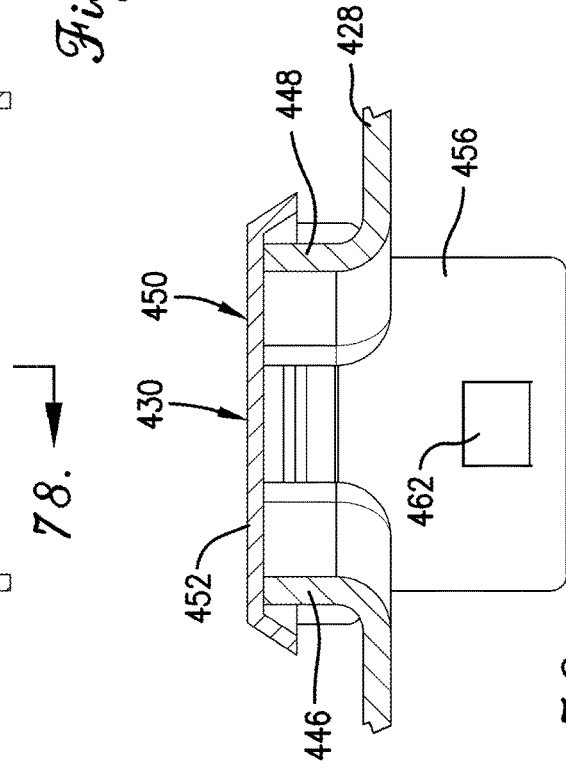

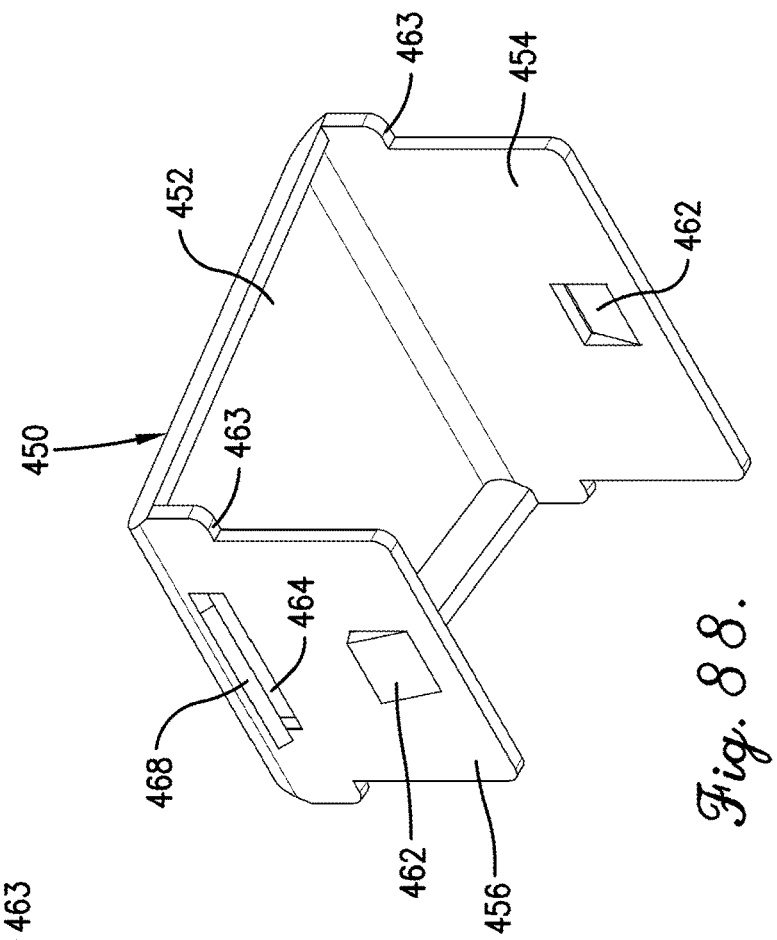
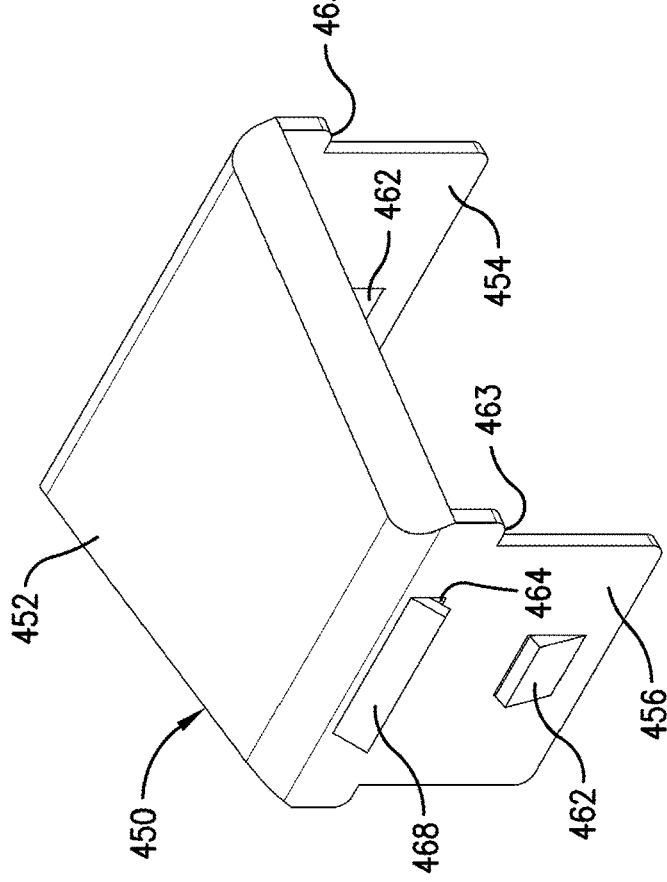

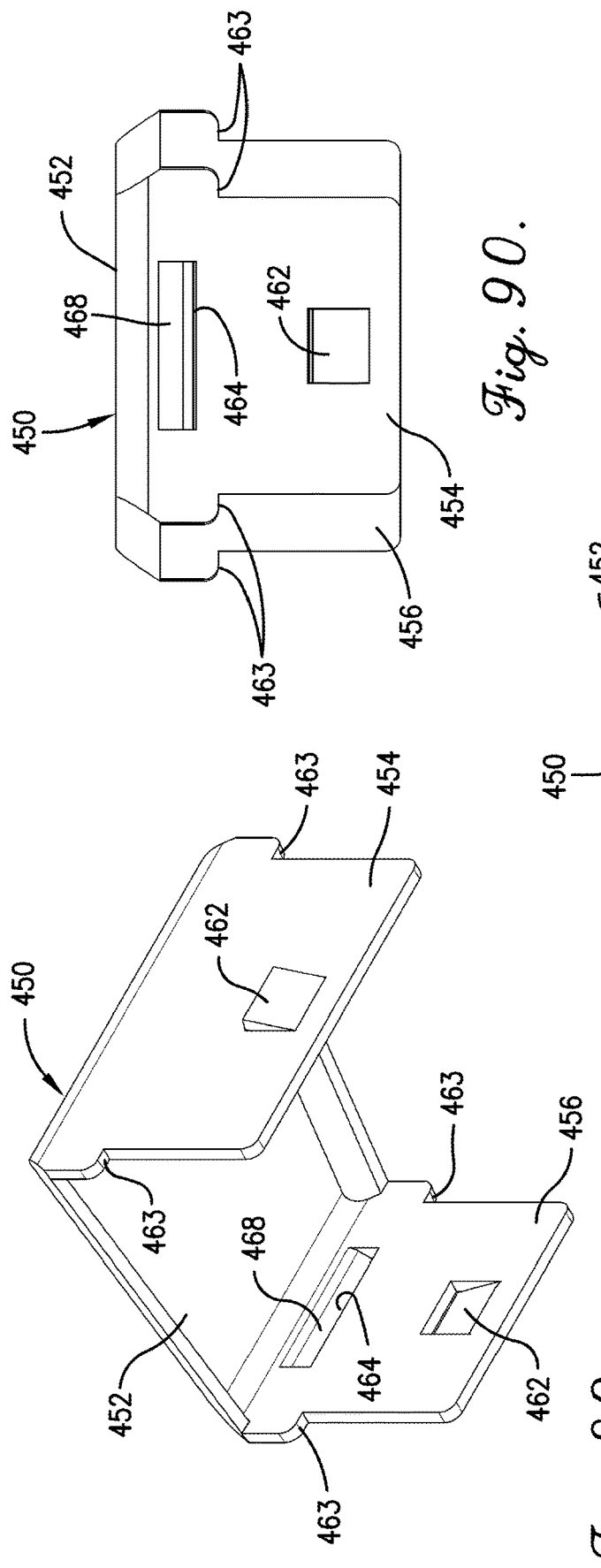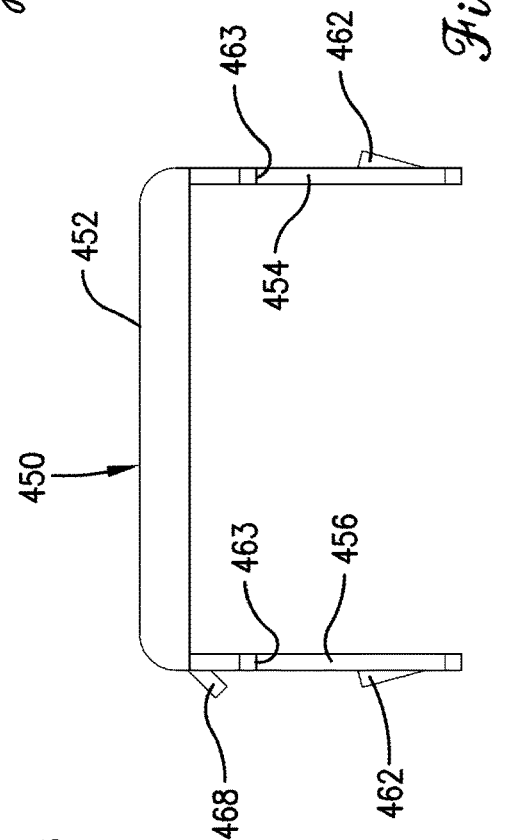

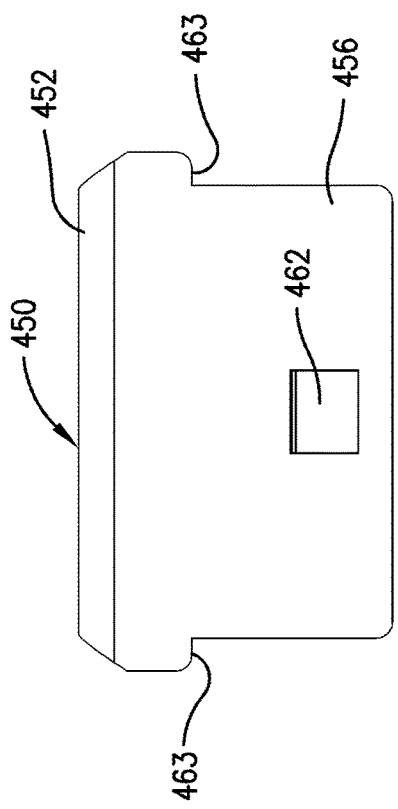
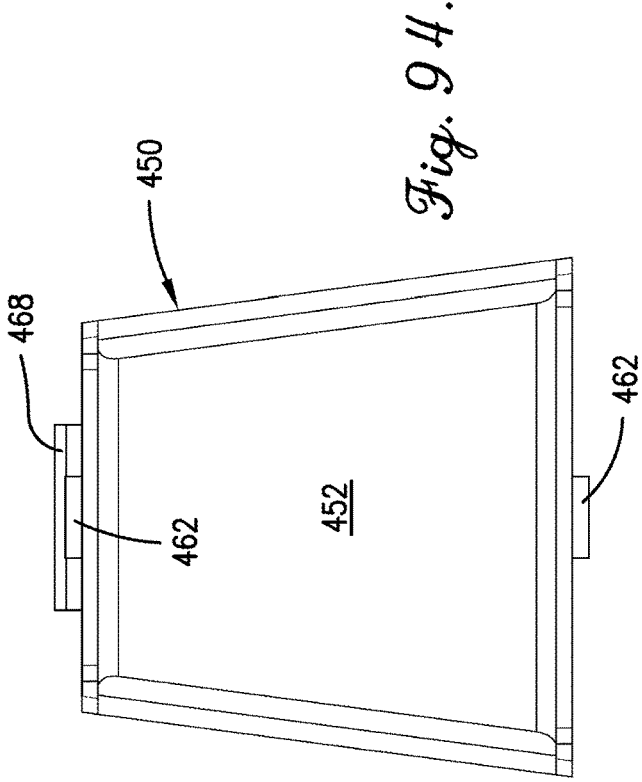
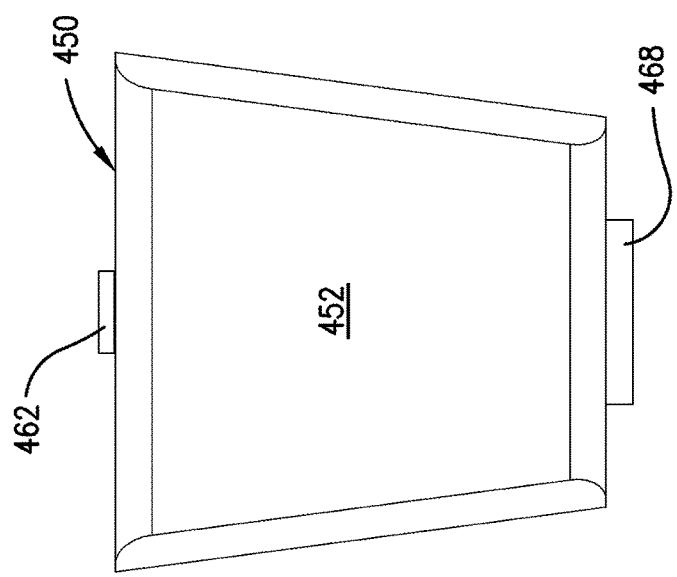

CONTACT TRAY FOR A MASS TRANSFER COLUMN

RELATED APPLICATION

This application is a division of and claims priority to U.S. application Ser. No. 16/225,408 filed Dec. 19, 2018, which claims priority to U.S. Provisional Application No. 62/610,815 filed Dec. 27, 2017, with the above-identified applications being incorporated by reference herein in their entirety.

BACKGROUND OF THE INVENTION

The present invention relates generally to columns in which mass transfer and heat exchange occur and, more particularly, to contact trays for use in such columns to facilitate interaction between fluid streams flowing within the columns.

Mass transfer columns are configured to contact at least two fluid streams in order to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along or above the surfaces of mass transfer structures that are placed in the interior region of the column to facilitate intimate contact between the two fluid phases. The rate and/or degree of mass and heat transferred between the two phases is enhanced by these mass transfer structures, which may be in the form of various types of trays, structured packing, random packing, or grid packing.

The trays used in mass transfer columns normally extend horizontally across substantially the entire horizontal cross section of the column and are supported around their perimeter by rings welded to the inner surface of the circular column wall or shell. A number of trays are positioned in vertically spaced-apart relationship. The trays may be located in only a portion of the column to perform one part of a multi-step process occurring with the column. Alternatively, the trays may fill substantially the entire open area within the column.

Trays of the type described above contain one or more downcomers that are positioned at openings in the tray deck to provide passageways for liquid to descend from one tray to an adjacent lower tray. Prior to entering the downcomer, the liquid on the tray deck interacts with ascending vapor that passes through openings provided in selected portions of the tray deck. Those areas of the tray deck containing vapor openings are commonly referred to as "active" areas because of the vapor and liquid mixing and frothing that occurs above those areas of the tray.

The vapor openings in the tray deck can be simple sieve holes or can be formed as part of fixed or moveable valves. Conventional valves have valve covers supported over the opening in the tray deck by legs. In fixed valves, the valve cover is fixed against vertical movement. In moveable valves, the valve cover is able to move up and down in response to variations in the pressure of vapor or fluid ascending through the opening. To allow vertical movement of the valve cover, the legs extend through the vapor openings or other openings in the tray deck and include a lower portion that is bent to contact an underside of the tray deck and thereby limit the range of vertical movement of the valve cover. The bending of the lower portions of the legs after they have been inserted through the vapor opening or other openings in the tray deck is labor-intensive and significantly increases the time required to assemble the valves in the trays.

In some valves, the lower portions of the legs are pre-bent in opposite directions. By squeezing the lower portions of the legs toward each other, the bent portions of the legs can be inserted through the vapor opening. When the pressure is released, the bent portions move away from each other and are able to engage against the underside of the tray deck to prevent removal of the legs from the vapor opening. While inserting the legs into the vapor opening in this manner facilitates the assembly of the valves in the tray, the legs extend outwardly beyond the valve cover and create unshielded regions where vapor can escape from the desired flow direction when exiting the valve. A need has thus developed for an improved valve that is readily assembled and restricts vapor from escaping from the valve in undesired flow directions.

SUMMARY OF THE INVENTION

In one aspect, the present invention is directed to a contact tray for use in a mass transfer column. The contact tray comprises a tray deck for receiving a liquid stream and a plurality of valves distributed across the tray deck. Each of the valves comprises an opening in the tray deck to allow for passage of fluid through the tray deck for interaction with the liquid stream when it is received on the tray deck. The opening has a central segment and extensions that extend outwardly from opposite ends of the central segment. The valves each includes wall segments that extend upwardly along opposite sides of the central segment of the opening and a valve body comprising a valve cover positioned in covering relationship above the opening. The valve body includes legs that are attached to the valve cover at recesses located at opposite ends of the valve cover and extend downwardly through the extensions in the opening. The valve cover has sides that extend outwardly beyond the sides of the opening.

In other aspects, the central segment of the opening may be circular and the extensions may be rectangular. The lower portion of each of the legs may include at least one stop for contact against the tray deck to limit the vertical movement of the legs within the extensions of the opening. Deflectors may be positioned adjacent opposite sides of the legs and extend downwardly below the sides of the valve cover to restrict vapor passage around the legs. The sides of the valve cover may be curved.

In another aspect, the present invention is directed to the contact tray in which each of the valves comprises: an opening in the tray deck to allow for passage of vapor through the tray deck for interaction with the liquid stream when it is received on the tray deck, the opening having a central segment and extensions that extend outwardly from opposite ends of the central segment and include transversely-extending slots, wall segments that extend upwardly along opposite sides of the central segment of the opening, and a valve body comprising a trapezoidal valve cover positioned in covering relationship above the opening and extensions and having legs that are attached to the valve cover at opposite ends of the valve cover and extend downwardly through said slots in the extensions of the opening, wherein said valve cover has sides that extend outwardly beyond the sides of the central segment and the extensions of the opening.

BRIEF DESCRIPTION OF THE DRAWINGS

In the accompany drawings that form part of the specification and in which like reference numerals are used to indicate like components in the various views:

FIG. 16 is a bottom perspective view of the valve body shown in FIG. 15;

FIG. 17 is a top perspective view of the valve body shown from the upstream end of the valve cover;

FIG. 18 is a downstream end elevation view of the valve body;

FIG. 19 is a side elevation view of the valve body;

FIG. 20 is an upstream end elevation view of the valve body;

FIG. 21 is a top plan view of the valve body;

FIG. 22 is a bottom plan view of the valve body;

FIG. 25 is a side elevation view of the contact tray taken in vertical section along line 25-25 of FIG. 24 in the direction of the arrows and shown on a further enlarged scale with one of the valves in the closed position and the other valve in the open position;

FIG. 26 is an elevation view of the contact tray and the closed valve shown in FIG. 25 and taken in vertical section along line 26-26 of FIG. 25 in the direction of the arrows;

FIG. 27 is an elevation view of the contact tray and the open valve shown in FIG. 25 and taken in vertical section along line 27-27 of FIG. 25 in the direction of the arrows;

FIG. 38 is a downstream end elevation view of the valve body;

FIG. 39 is a side elevation view of the valve body;

FIG. 40 is an upstream end elevation view of the valve body;

FIG. 41 is a top plan view of the valve body;

FIG. 42 is a bottom plan view of the valve body;

FIG. 43 is a fragmentary, partially-exploded perspective view of a further one of the contact trays having a third valve embodiment;

FIG. 45 is a side elevation view of the contact tray taken in vertical section along line 45-45 of FIG. 44 in the direction of the arrows and shown on a further enlarged scale with one of the valves in the closed position and the other valve in the open position;

FIG. 46 is an elevation view of the contact tray and the closed valve shown in FIG. 45 and taken in vertical section along line 46-46 of FIG. 45 in the direction of the arrows;

FIG. 47 is an elevation view of the contact tray and the open valve shown in FIG. 45 and taken in vertical section along line 47-47 of FIG. 45 in the direction of the arrows;

FIG. 57 is a side elevation view of the contact tray taken in vertical section along line 57-57 of FIG. 56 in the direction of the arrows and shown on a further enlarged scale with one of the valves in the closed position and the other valve in the open position;

FIG. 58 is an elevation view of the contact tray and the closed valve shown in FIG. 57 and taken in vertical section along line 58-58 of FIG. 57 in the direction of the arrows;

FIG. 59 is an elevation view of the contact tray and the open valve shown in FIG. 57 and taken in vertical section along line 59-59 of FIG. 57 in the direction of the arrows;

FIG. 67 is a top perspective view of one of the valve bodies from the third and fourth valve embodiments shown from the downstream end of the valve body;

FIG. 68 is a bottom perspective view of the valve body shown in FIG. 67;

FIG. 69 is a top perspective view of the valve body shown from the upstream end of the valve body;

FIG. 70 is a downstream end elevation view of the valve body;

FIG. 71 is a side elevation view of the valve body;

FIG. 72 is an upstream end elevation view of the valve body;

FIG. 73 is a top plan view of the valve body;

FIG. 74 is a bottom plan view of the valve body;

FIG. 77 is a side elevation view of the contact tray taken in vertical section along line 77-77 of FIG. 76 in the direction of the arrows and shown on a further enlarged scale with one of the valves in the closed position and the other valve in the open position;

FIG. 78 is an elevation view of the contact tray and the closed valve shown in FIG. 77 and taken in vertical section along line 78-78 of FIG. 77 in the direction of the arrows;

FIG. 79 is an elevation view of the contact tray and the open valve shown in FIG. 77 and taken in vertical section along line 79-79 of FIG. 77 in the direction of the arrows;

FIG. 87 is a top perspective view of one of the valve bodies from the fifth valve embodiment shown from the downstream end of the valve body;

FIG. 88 is a bottom perspective view of the valve body shown in FIG. 87;

FIG. 89 is a top perspective view of the valve body shown from the upstream end of the valve body;

FIG. 90 is a downstream end elevation view of the valve body;

FIG. 91 is a side elevation view of the valve body;

FIG. 92 is an upstream end elevation view of the valve body;

FIG. 93 is a top plan view of the valve body; and

FIG. 94 is a bottom plan view of the valve body.

DETAILED DESCRIPTION

Figure 1:
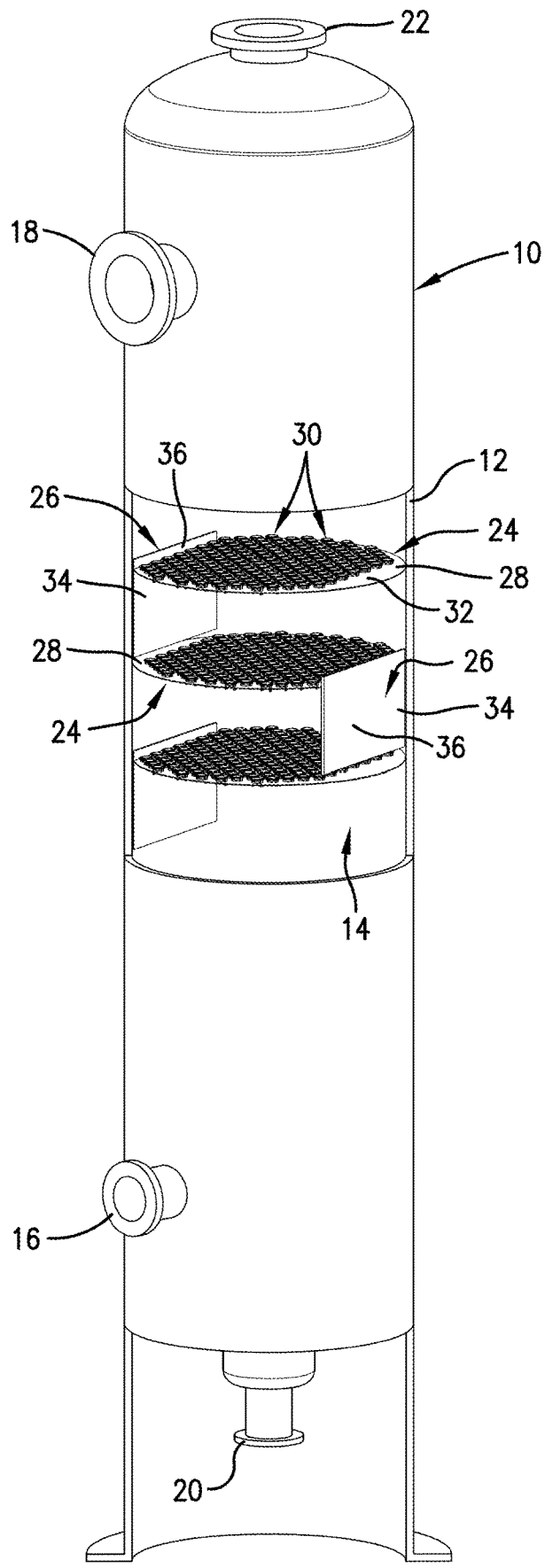
FIG. 1 is a fragmentary, perspective view of a mass transfer column in which a portion of a shell of the column is broken away to show one embodiment of contact trays of the present invention.

Turning now to the drawings in greater detail and initially to FIG. 1, a mass transfer column suitable for use in mass transfer or heat exchange processes is represented generally by the numeral 10. The mass transfer column 10 includes an upright, external shell 12 that may be cylindrical in configuration, although other configurations, including polygonal, are possible and are within the scope of the present invention. The shell 12 may be of any suitable diameter and height and may be constructed from one or more rigid materials that are desirably inert to, or are otherwise compatible with, the fluids and conditions present during operation of the mass transfer column 10.

The mass transfer column 10 may be of a type used for processing fluid streams, typically liquid or vapor streams, to obtain fractionation products or to otherwise cause mass transfer or heat exchange between the fluid streams. For example, the mass transfer column 10 may be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, or other processes occur.

The shell 12 of the mass transfer column 10 defines an open internal region 14 in which the desired mass transfer or heat exchange between the fluid streams occurs. In one implementation, the fluid streams may comprise one or more ascending vapor streams and one or more descending liquid streams. In other implementations, the fluid streams may comprise substantially any combination of ascending or descending liquid streams or ascending or descending vapor streams.

One or more fluid streams may be directed into the mass transfer column 10 through any number of feed lines, such as lower feed line 16 and upper feed line 18, positioned at appropriate locations along the height of the mass transfer column 10. In one implementation, vapor streams may be generated within the mass transfer column 10 rather than being introduced into the mass transfer column 10 through the feed lines 16 and 18. One or more fluid streams may be directed out of the mass transfer column 10 through any number of takeoff lines, such as lower takeoff line 20 and upper takeoff line 22. In one implementation, liquid may be introduced through upper feed line 18, descend through the mass transfer column 10, and be removed through lower takeoff line 20, while vapor may be introduced through lower feed line 16, ascend through the mass transfer column 10, and be removed through upper takeoff line 22.

Other mass transfer column components that would typically be present, such as reflux stream lines, reboilers, condensers, vapor horns, liquid distributors, and the like, are not illustrated in the figures because they are conventional in nature and an illustration of these components is not believed to be necessary for an understanding of the present invention.

A plurality of contact trays 24 are positioned within the open internal region 14 of the mass transfer column 10 to facilitate interaction of the fluids flowing within the open internal region 14. The contact trays 24 extend generally horizontally across the entire cross-section of the mass transfer column 10 and are arranged in vertically spaced-apart relationship to each other. The specific design of each contact tray 24 can be varied while remaining within the scope of the present invention.

Figure 2:
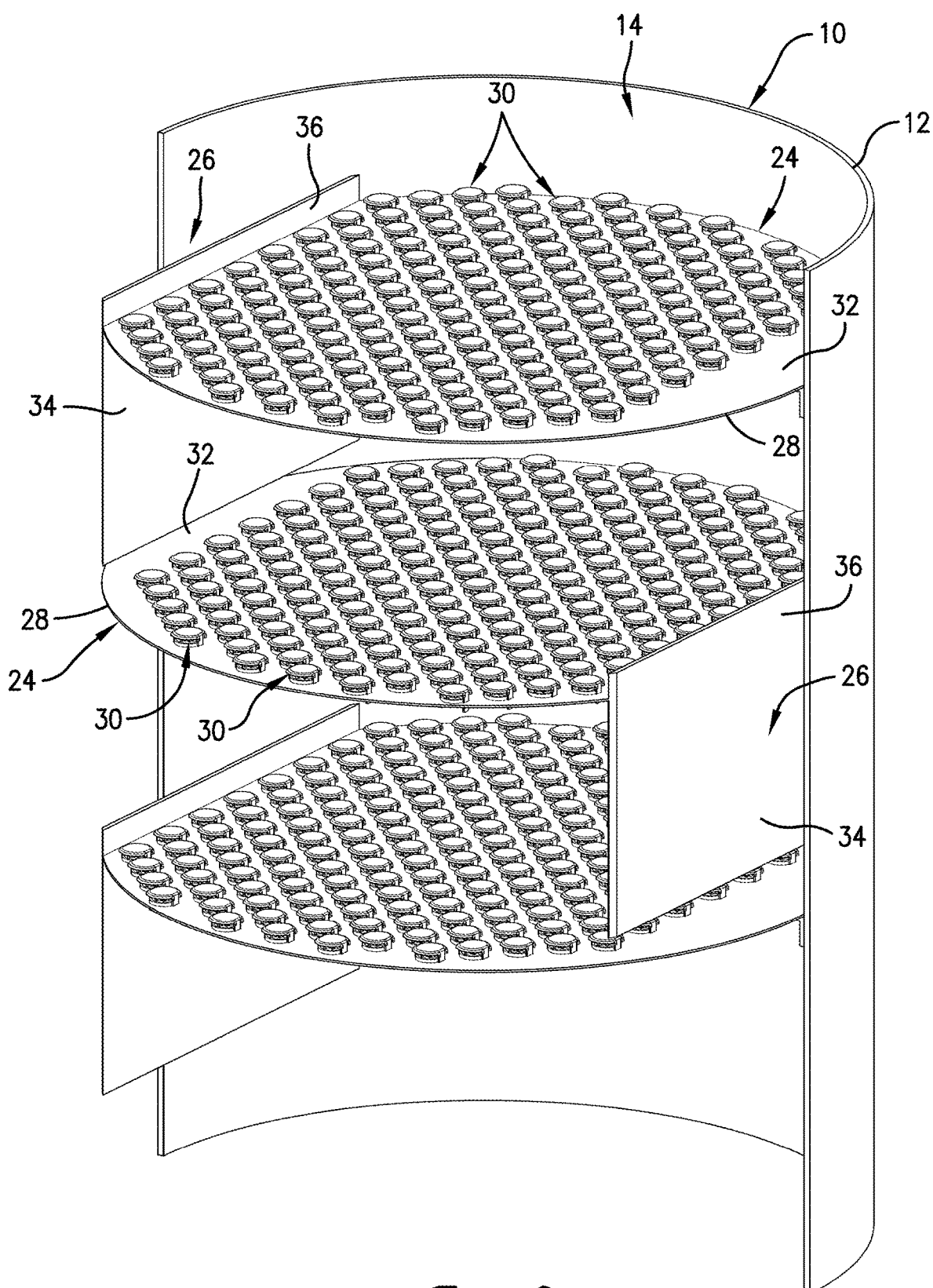
FIG. 2 is a perspective view of the contact trays in the column shown in FIG. 1, and shown on an enlarged scale from that used in FIG. 1.
Figure 3:
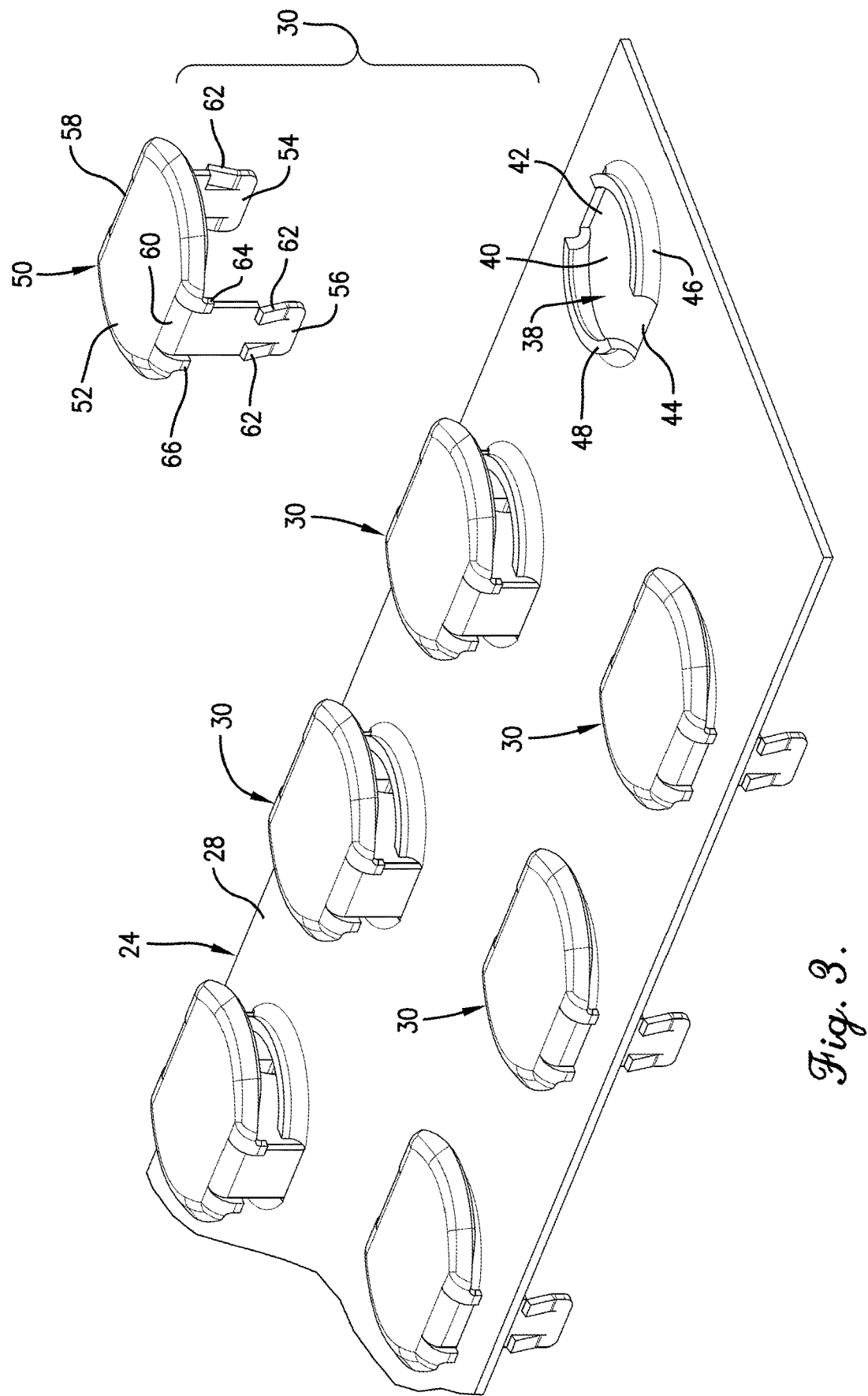
FIG. 3 is a fragmentary, partially-exploded perspective view of one of the contact trays of FIGS. 1 and 2, showing valves of the contact tray on a further enlarged scale and with one row of the valves shown in a closed position and the other row shown in an open position.

In the illustrated embodiment of FIGS. 1-2, the contact trays 24 are constructed to form a single-pass fluid flow arrangement in which a liquid stream flows end-to-end in one direction on one of the contact trays 24 and then descends to a lower adjacent one of the contact trays 24 where it flows end-to-end in the opposite flow direction. Each of the contact trays 24 has a side downcomer 26 that is positioned at one end of a tray deck 28 that may be formed from interconnected individual tray panels. The side downcomer 26 receives and removes the descending liquid stream from the tray deck 28 of the associated contact tray 24 and delivers it to one end of the tray deck 28 of an underlying one of the contact trays 24. The liquid stream received on that tray deck 28 then flows across the tray deck 28 in an opposite direction to the side downcomer 26 that is positioned at the opposite end of the tray deck 28. The liquid stream enters the side downcomer 26 and is delivered to the tray deck 28 of the next underlying contact tray 24. This flow pattern is repeated on each successive one of the of the contact trays 24. Although the trays 24 are illustrated as being constructed for single-pass fluid flow, the invention encompasses trays constructed for multi-pass flow.

A plurality of valves 30 is distributed across the tray decks 28 of the contact trays 24 to allow vapor or another fluid to ascend through the tray decks 28 and interact with the liquid flowing across the upper surface of the tray decks 28. The area of the tray decks 28 containing these valves 30 is normally referred to as the active area of the contact trays 24. The valves 30 are positioned in a preselected arrangement on the active area. The valves 30 are shown as being arranged in parallel rows with the valves 30 adjacent rows staggered to form a triangular pitch. In an example of another arrangement, the valves 30 in adjacent rows are aligned to form a square pitch.

The area of the tray deck 28 on each contact tray 24 that underlies the side downcomer 26 of the overlying one of the contact trays 24 comprises an inlet panel 32. The inlet panel 32 is normally imperforate or has shielded flow passages that impede or prevent the descending fluid from passing through the inlet panel 32.

The side downcomer 26 of each contact tray 24 comprises a downcomer wall 34 that extends in a chordal fashion across the open internal region 14 of the mass transfer column 10 from opposite sides of the shell 12. The upper portion of the downcomer wall 38, or a separate panel attached to the downcomer wall 38, extends upwardly above the tray deck 26 to form an outlet weir 36 that causes liquid to accumulate on the tray deck 28 before spilling over the outlet weir 36 and entering the side downcomer 26, which delivers the liquid to the underlying tray deck 28. A lower portion of the downcomer wall 34 is spaced above the underlying tray deck 28 or contains flow openings (not shown) to allow fluid to exit the side downcomer 26 and flow along the upper surface of the tray deck 28 before entering the side downcomer 26 at the opposite end of the tray deck 28. The downcomer walls 34 are illustrated as being planar and vertically-extending, but stepped, sloped or multi-chordal walls or other constructions are within the scope of the invention.

Figure 4:
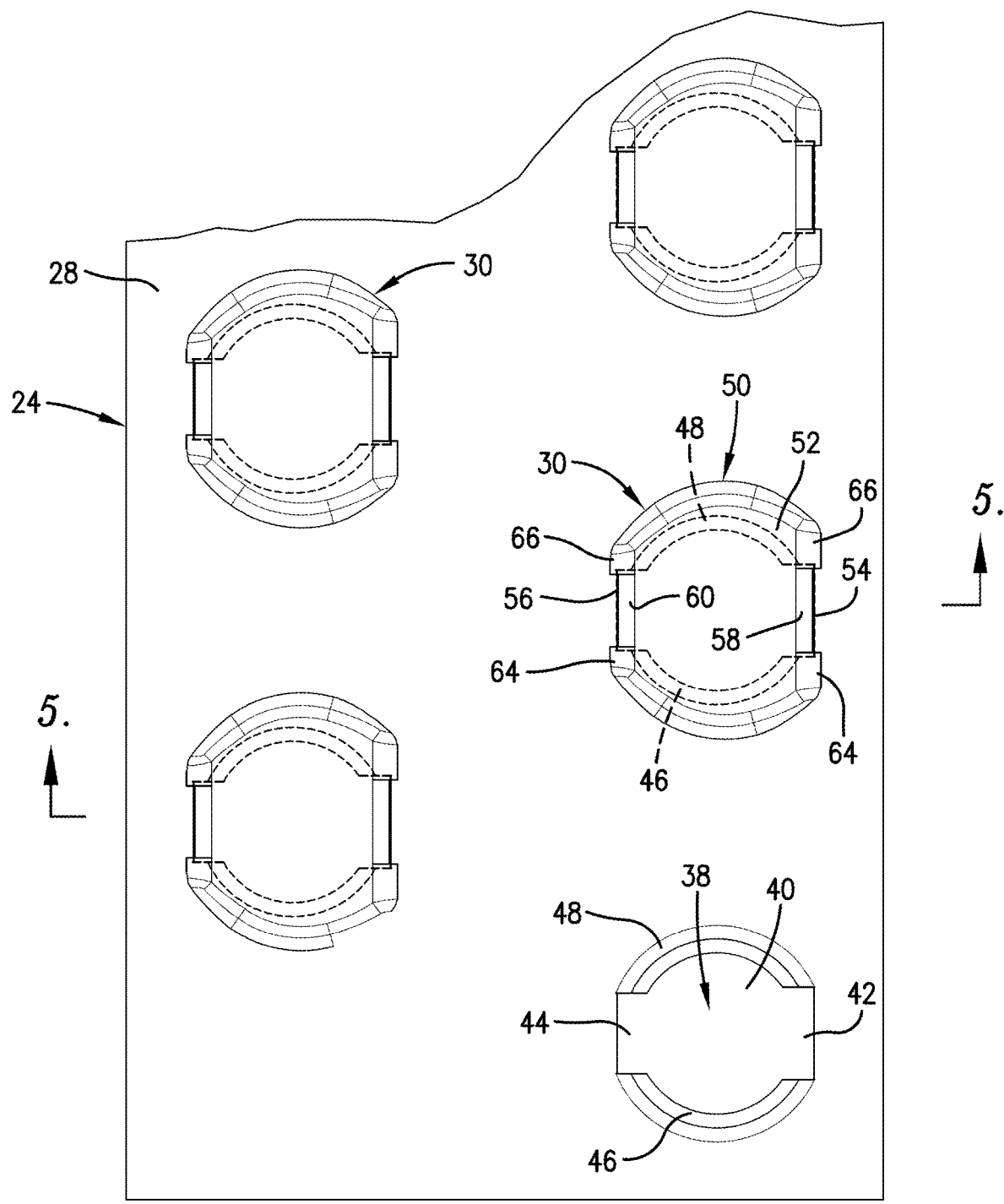
FIG. 4 is a fragmentary top plan view of a portion of the contact tray shown in FIG. 3 with a valve body of one of the valves removed.
Figure 5:
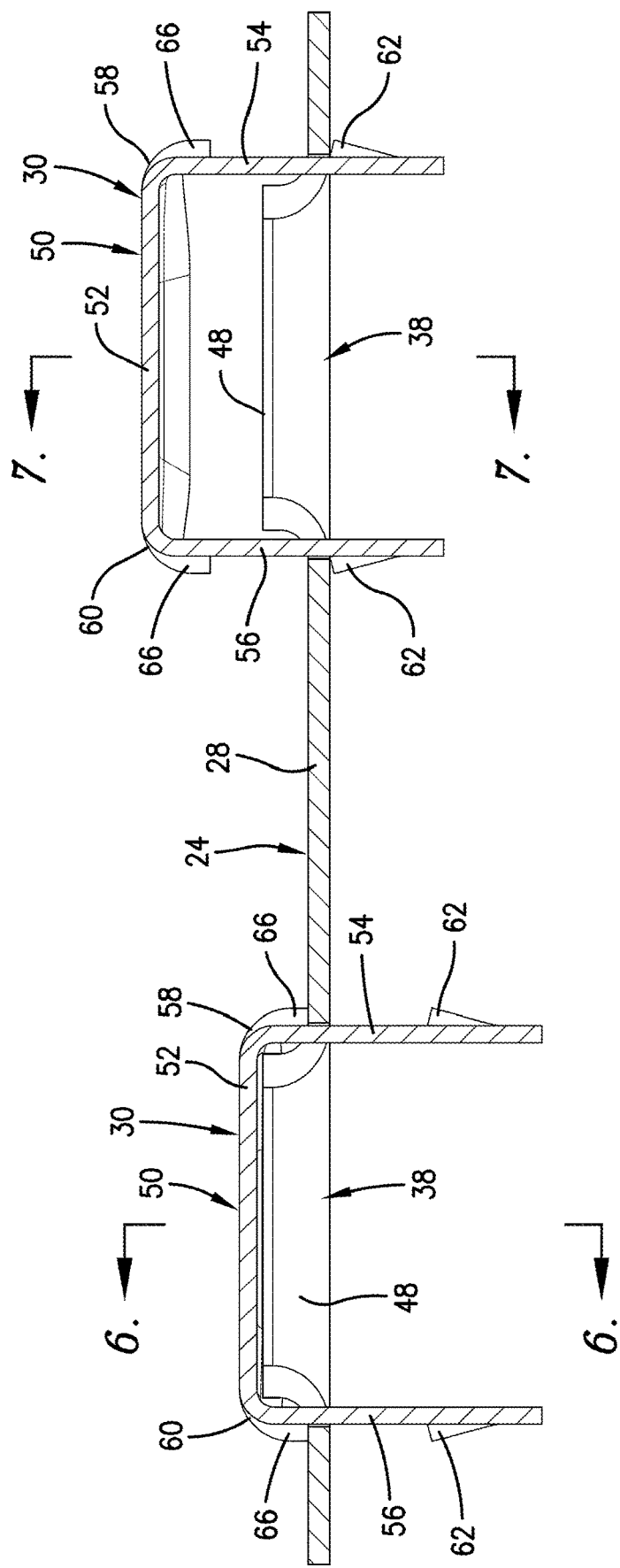
FIG. 5 is a side elevation view of the contact tray taken in vertical section along line 5-5 of FIG. 4 in the direction of the arrows and shown on a further enlarged scale with one of the valves in the closed position and the other valve in the open position.
Figure 6:
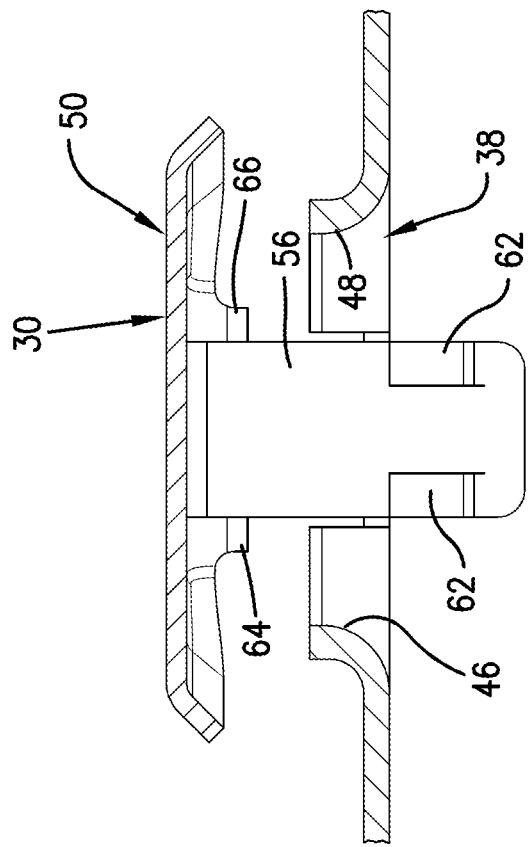
FIG. 6 is an elevation view of the contact tray and the closed valve shown in FIG. 5 and taken in vertical section along line 6-6 of FIG. 5 in the direction of the arrows.
Figure 7:
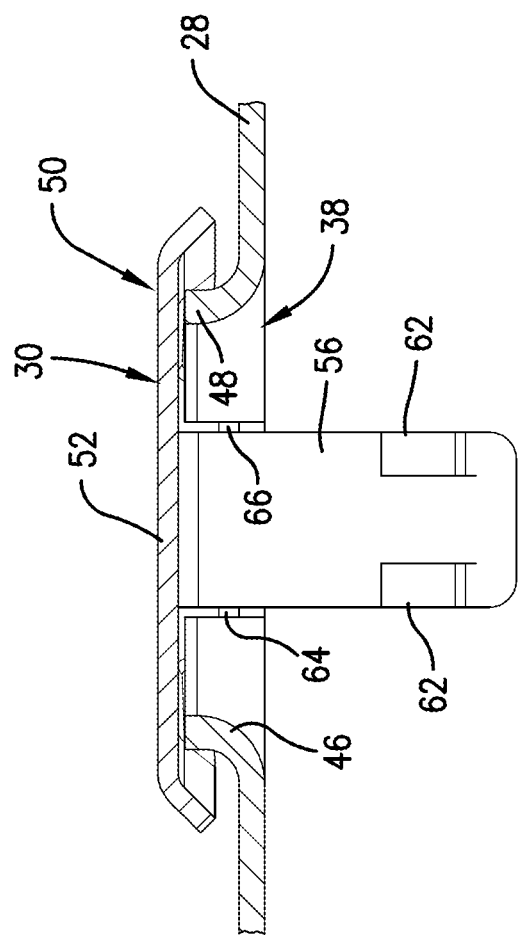
FIG. 7 is an elevation view of the contact tray and the open valve shown in FIG. 5 and taken in vertical section along line 7-7 of FIG. 5 in the direction of the arrows.
Figure 8:
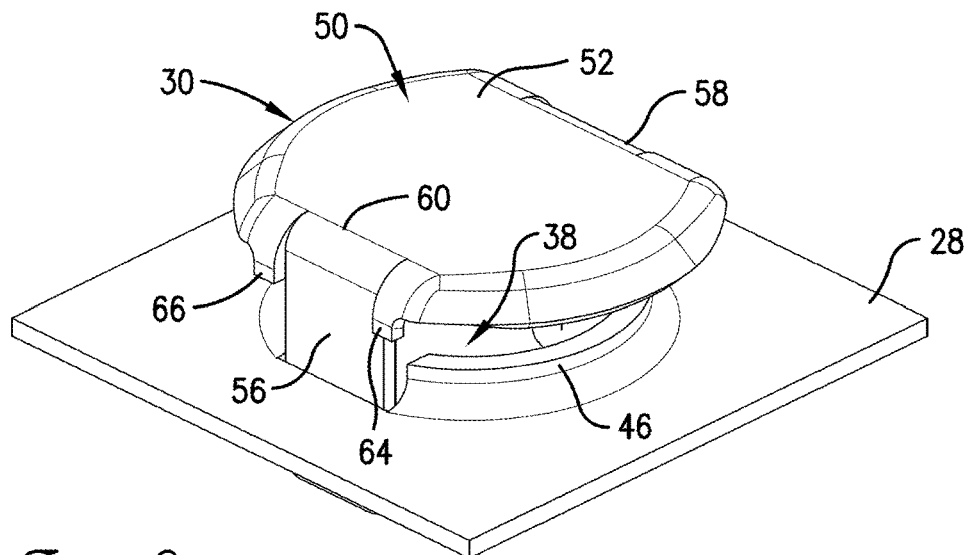
FIG. 8 is a top perspective view of the contact tray and the open valve shown in FIG. 7.
Figure 9:
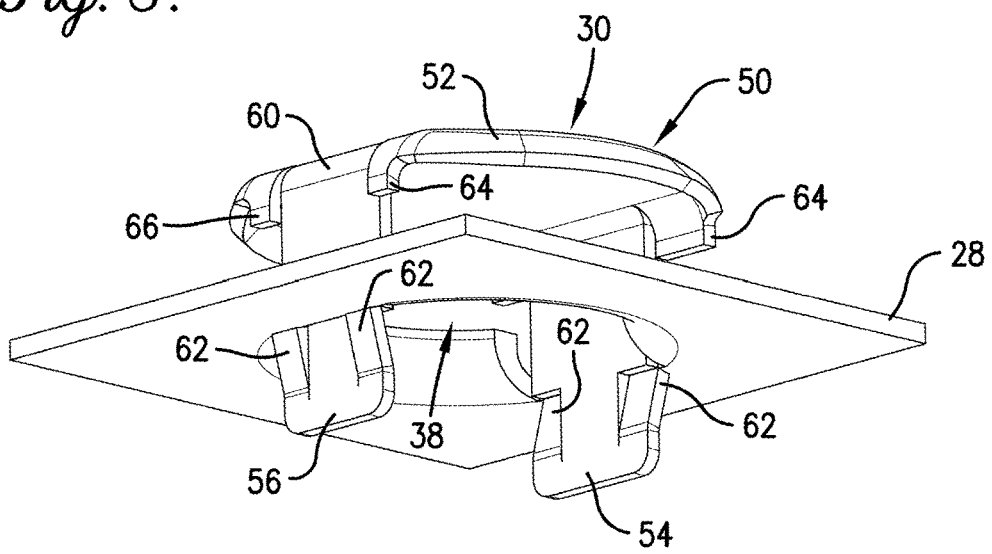
FIG. 9 is a bottom perspective view of the contact tray and the open valve.
Figure 10:
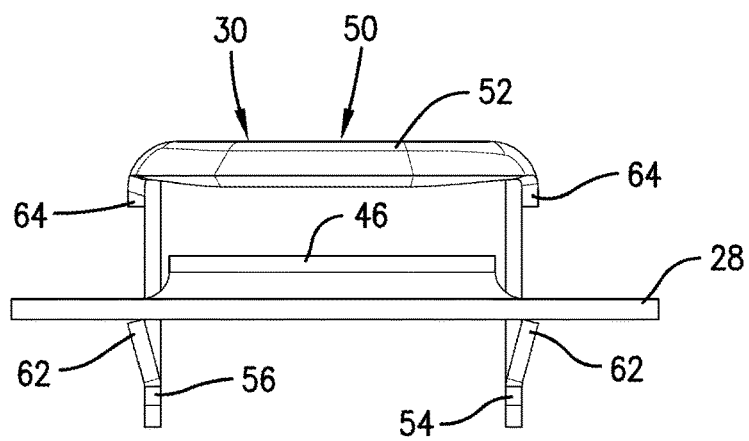
FIG. 10 is a side elevation view of the contact tray and the open valve.
Figure 11:
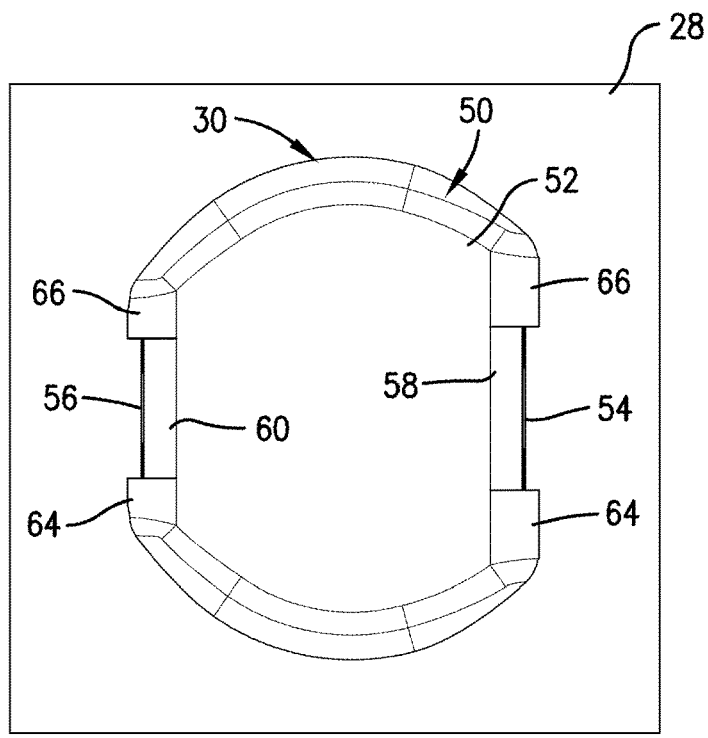
FIG. 11 is a top plan view of the contact tray and the open valve.
Figure 12:
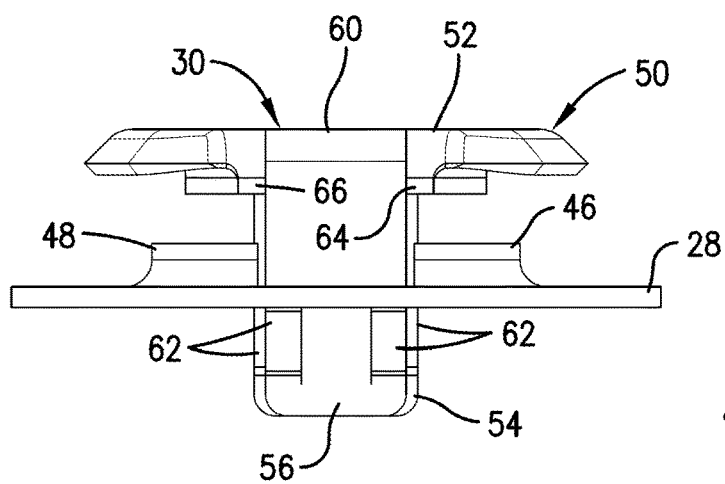
FIG. 12 is a downstream end elevation view of the contact tray and the open valve.
Figure 13:
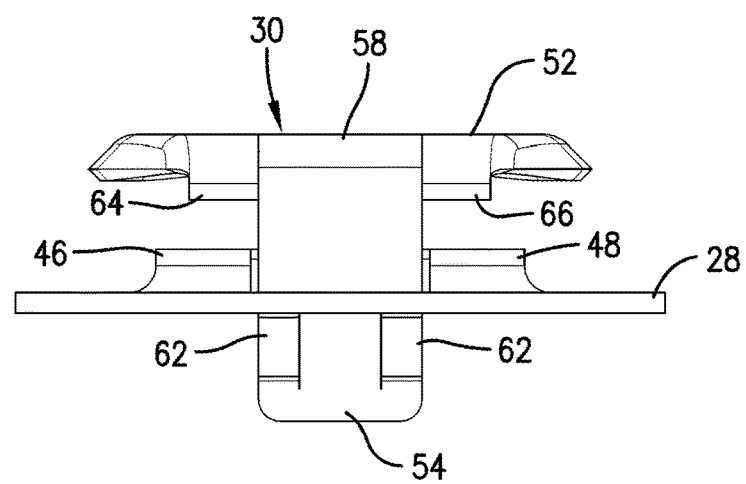
FIG. 13 is an upstream end elevation view of the contact tray and the open valve.
Figure 14:
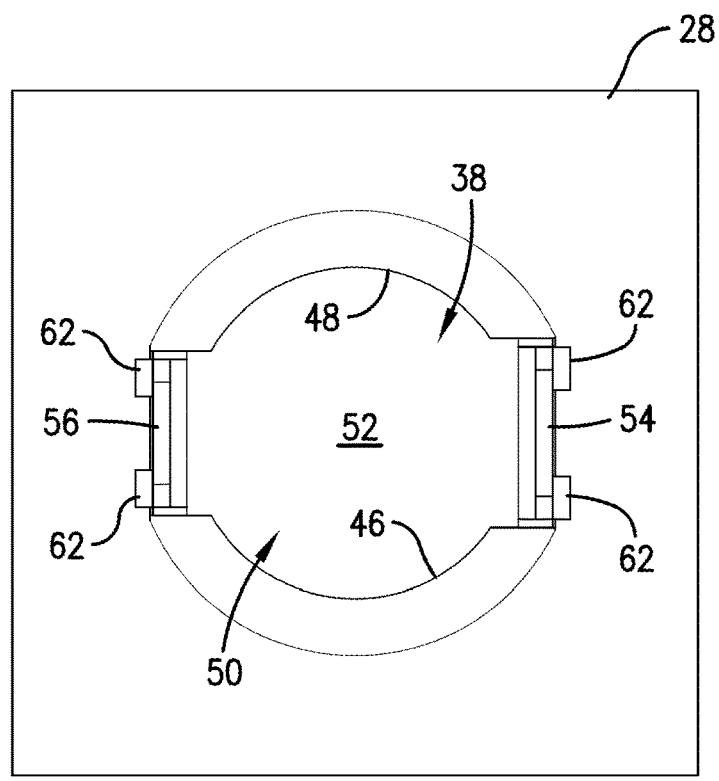
FIG. 14 is a bottom elevation view of the contact tray and the open valve.
Figure 15:
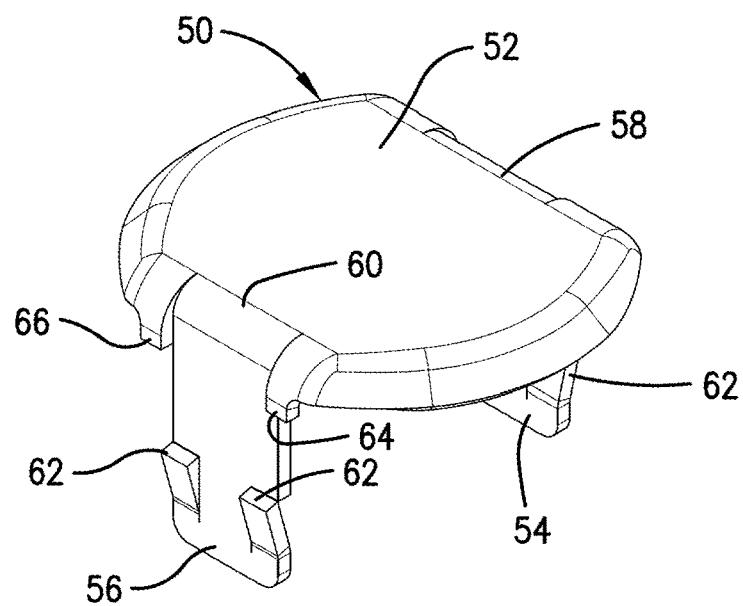
FIG. 15 is a top perspective view of one of the valve bodies shown from the downstream end of the valve body.
Figure 23:
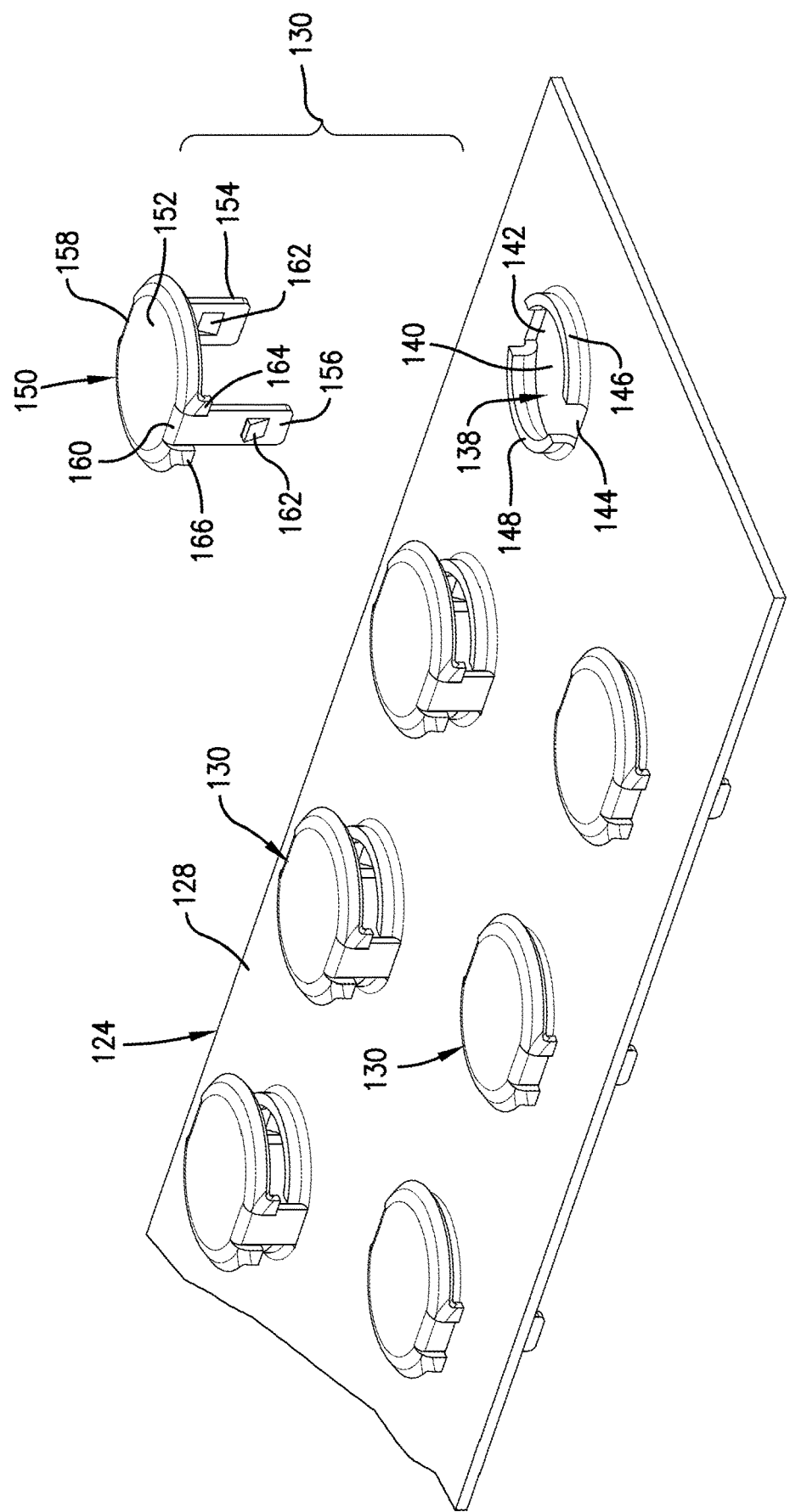
FIG. 23 is a fragmentary, partially-exploded perspective view of another one of the contact trays having a second valve embodiment.
Figure 24:
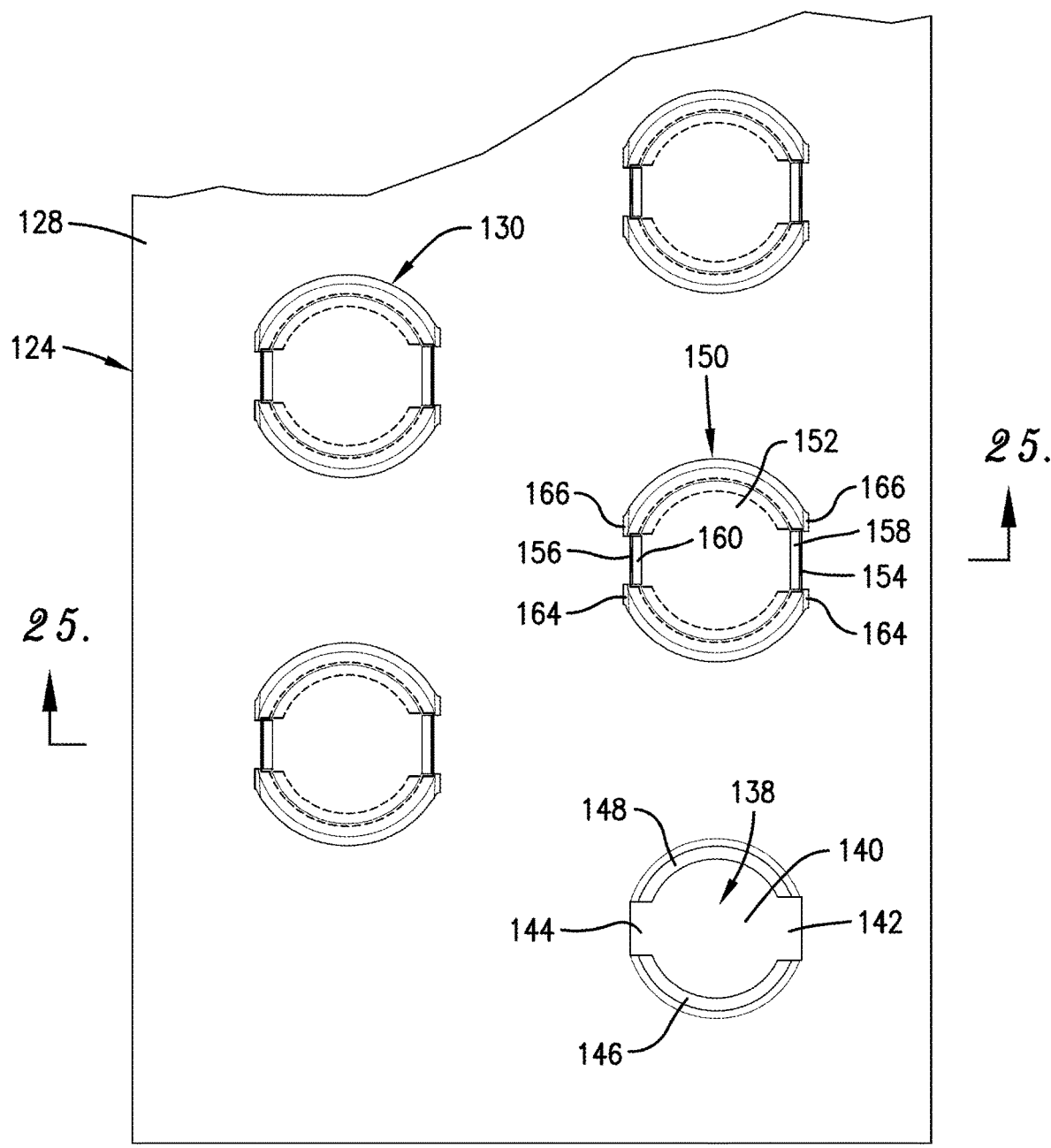
FIG. 24 is a fragmentary top plan view of a portion of the contact tray shown in FIG. 23 with a valve body of one of the valves removed.
Figure 28:
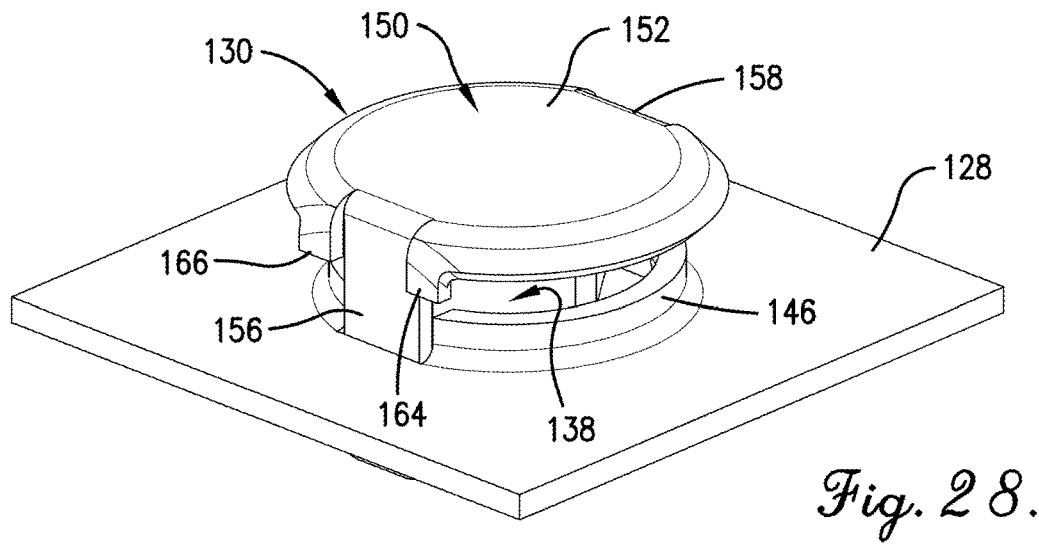
FIG. 28 is a top perspective view of the contact tray and the open valve shown in FIG. 27.
Figure 29:
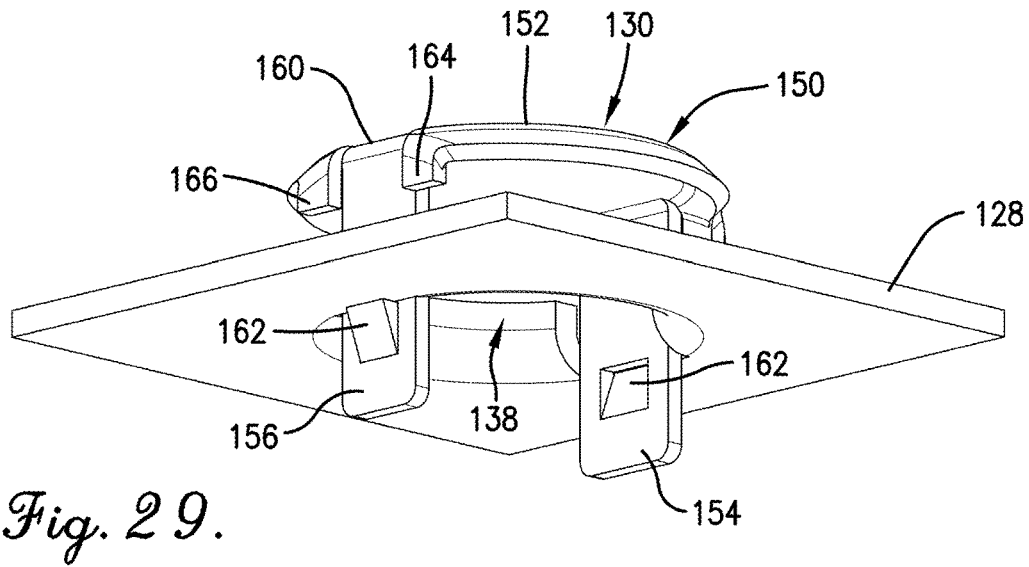
FIG. 29 is a bottom perspective view of the contact tray and the second valve embodiment in an open position.
Figure 30:
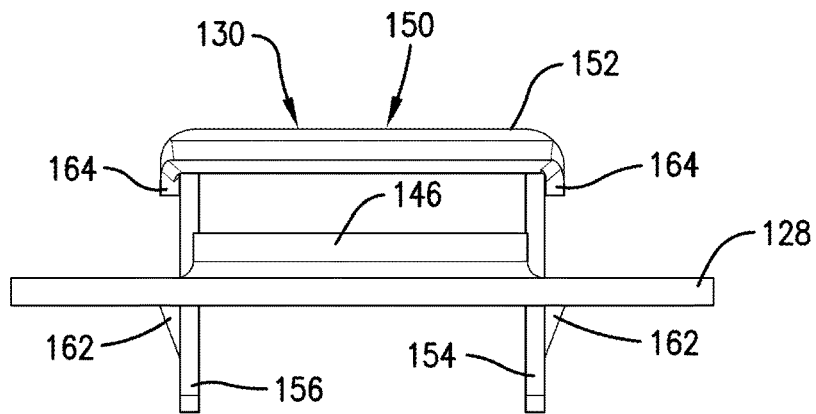
FIG. 30 is a side elevation view of the contact tray and the open valve.
Figure 31:
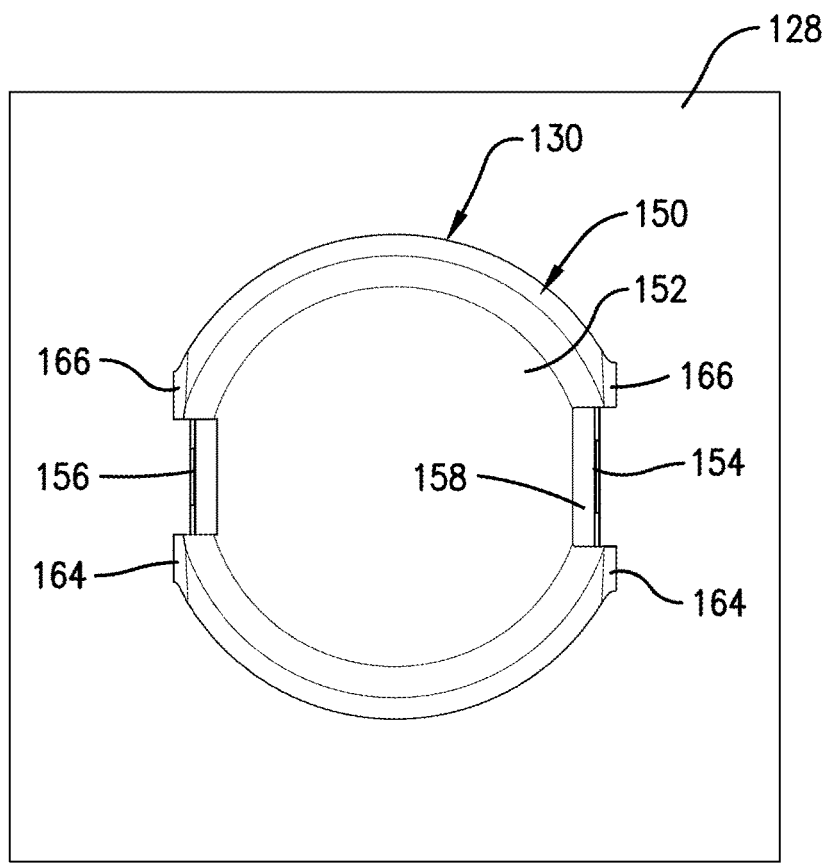
FIG. 31 is a top plan view of the contact tray and the open valve.
Figure 32:
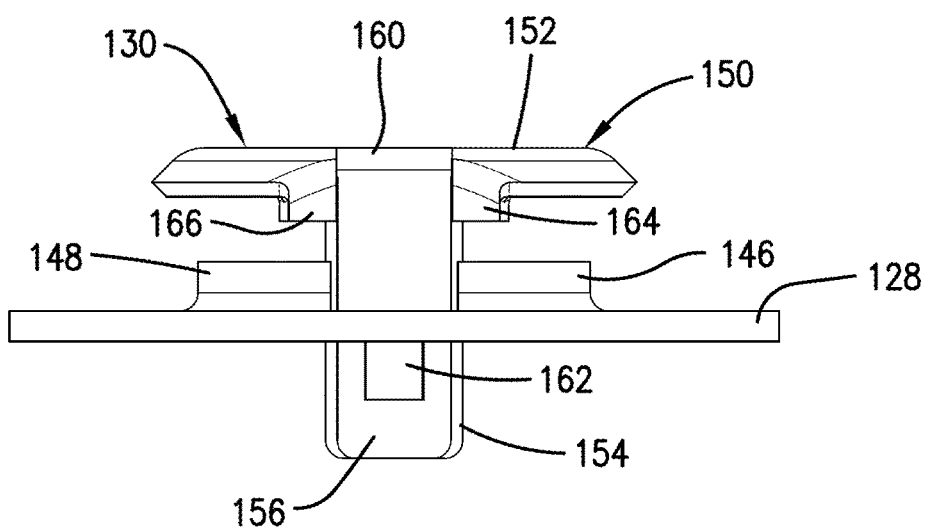
FIG. 32 is a downstream end elevation view of the contact tray and the open valve.
Figure 33:
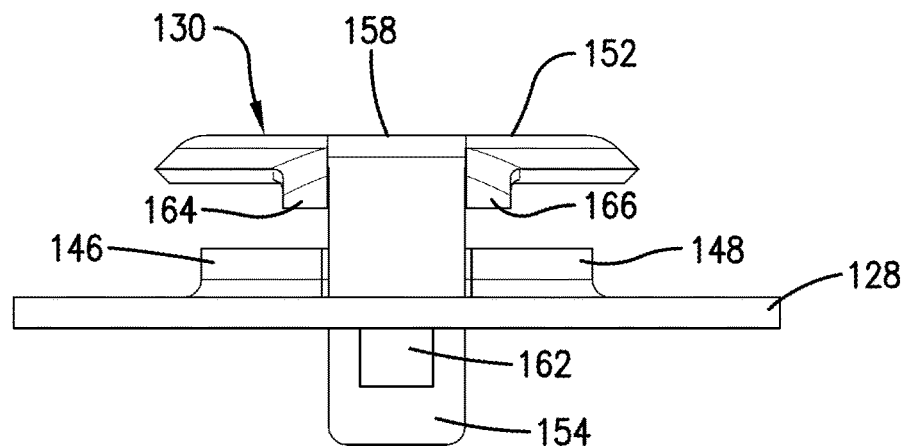
FIG. 33 is an upstream end elevation view of the contact tray and the open valve.
Figure 34:
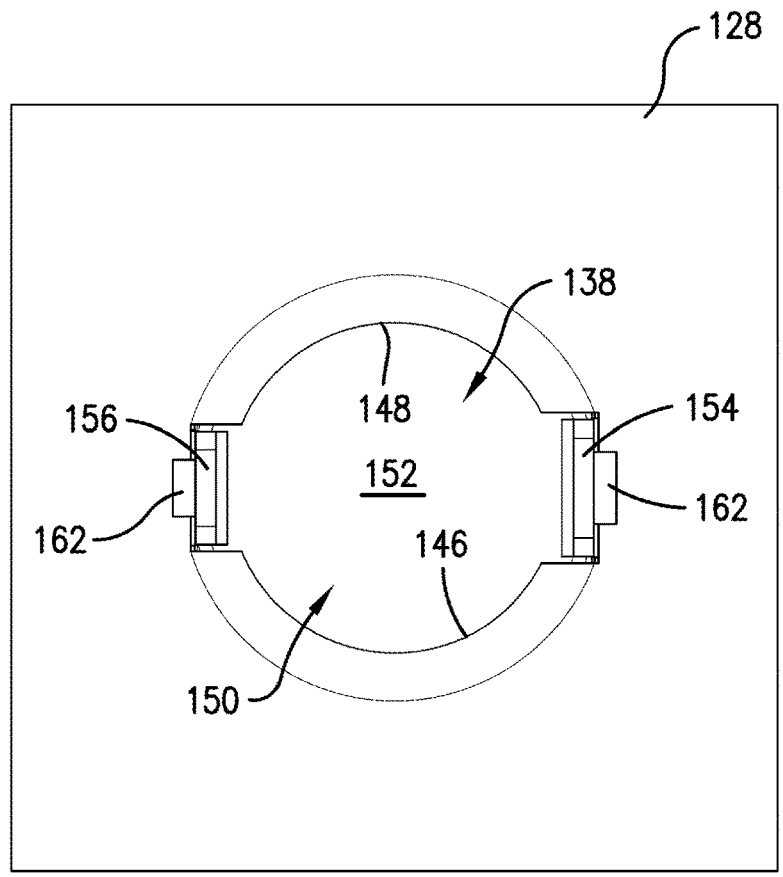
FIG. 34 is a bottom elevation view of the contact tray and the open valve.
Figure 36:
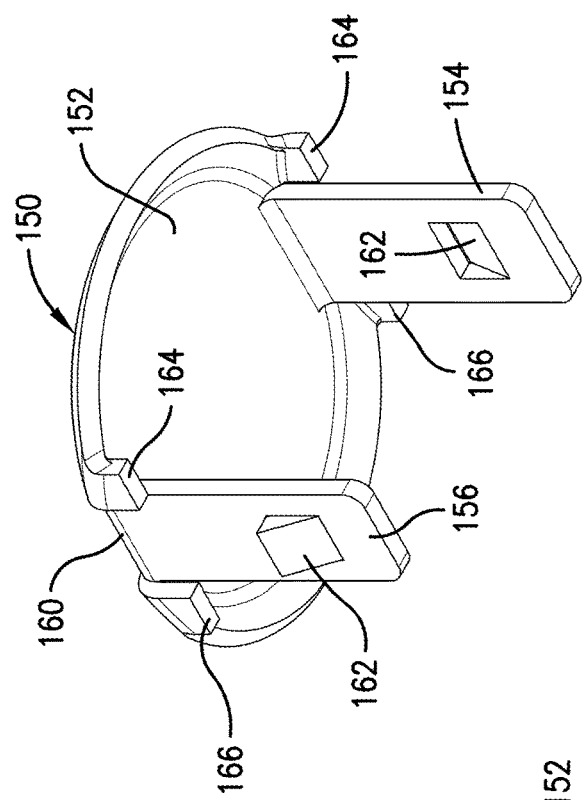
FIG. 36 is a bottom perspective view of the valve body shown in FIG. 35.
Figure 37:
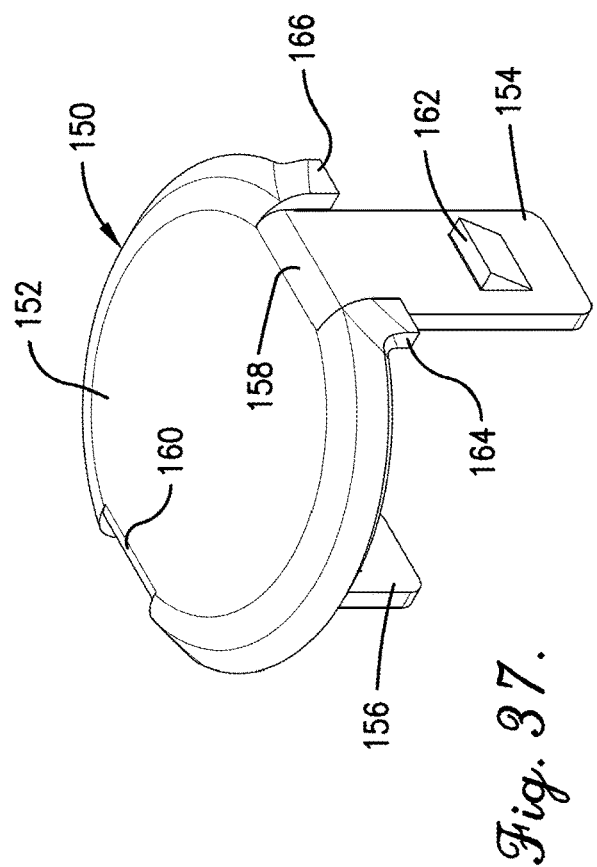
FIG. 37 is a top perspective view of the valve body shown from the upstream end of the valve body.
Figure 35:
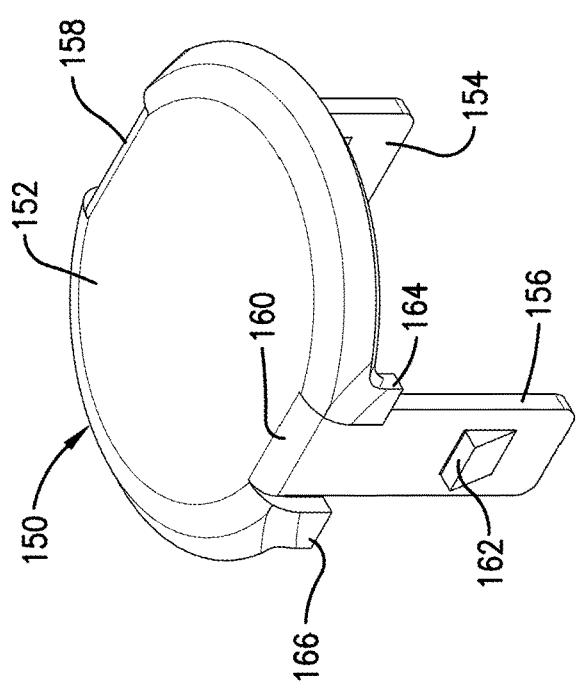
FIG. 35 is a top perspective view of one of the valve bodies shown from the downstream end of the valve body.
Figure 44:
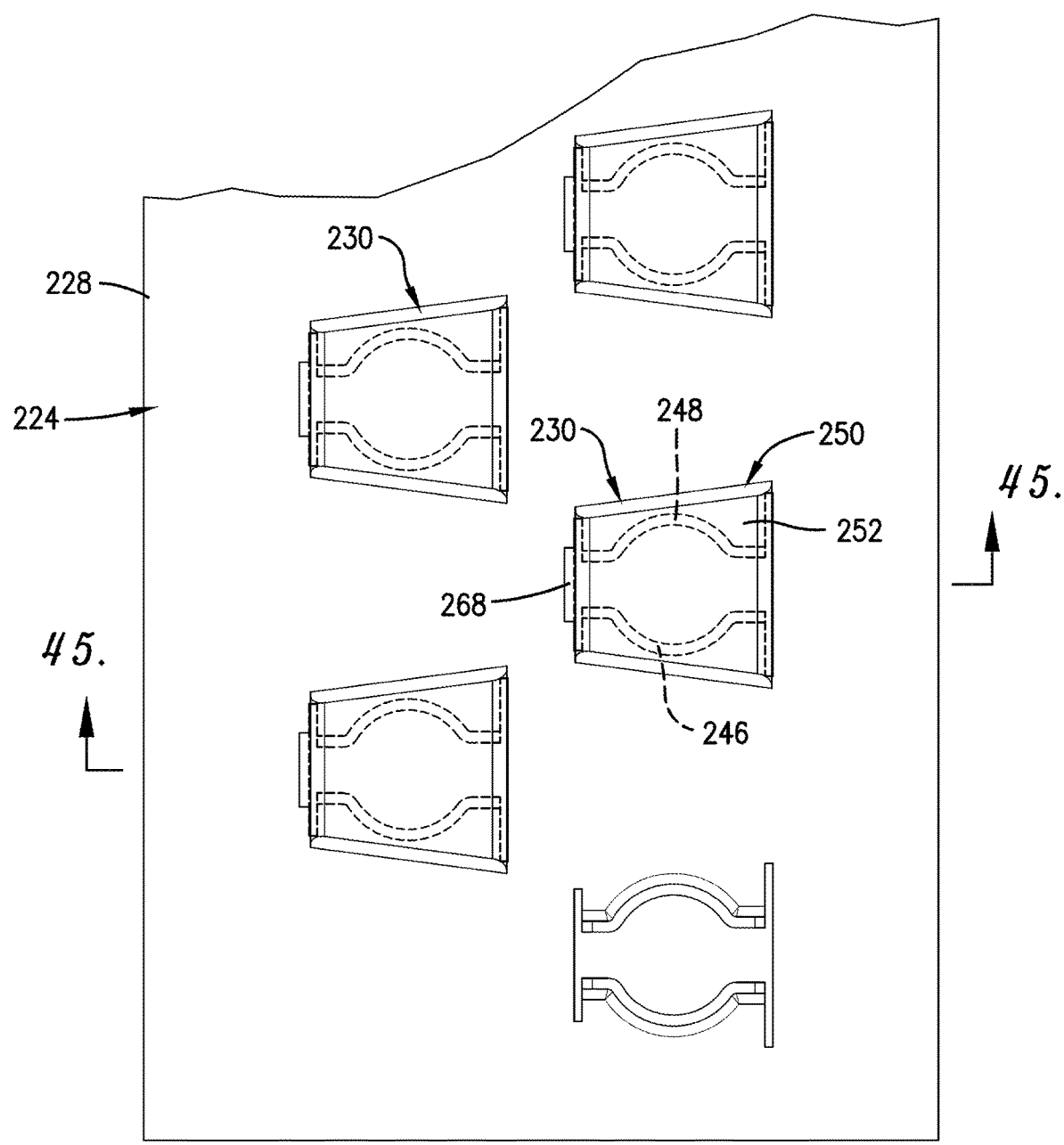
FIG. 44 is a fragmentary top plan view of a portion of the contact tray shown in FIG. 43 with a valve body of one of the valves removed.
Figure 48:
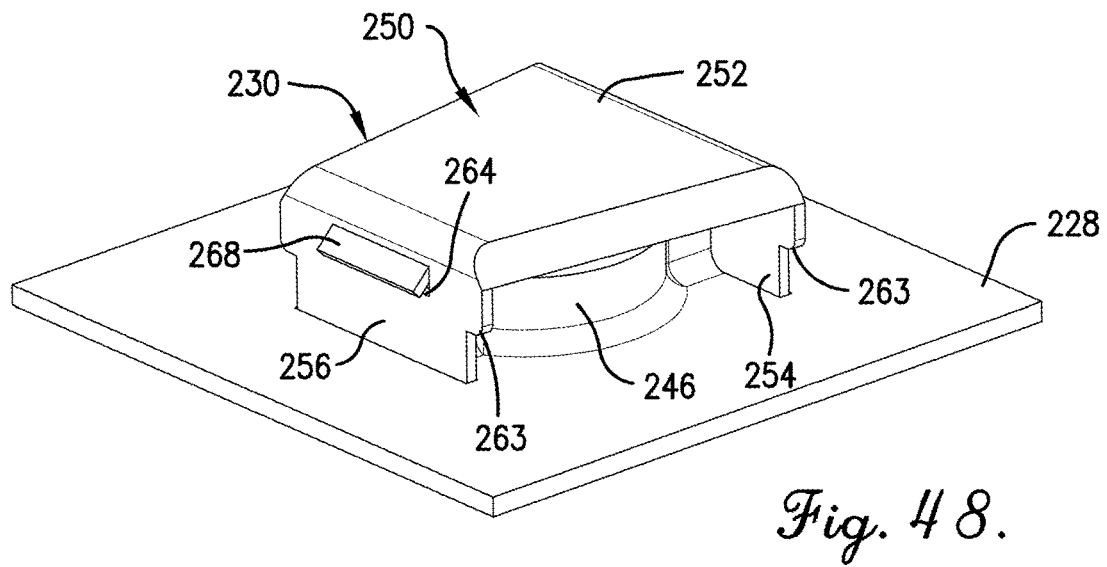
FIG. 48 is a top perspective view of the contact tray and the open valve shown in FIG. 47.
Figure 49:
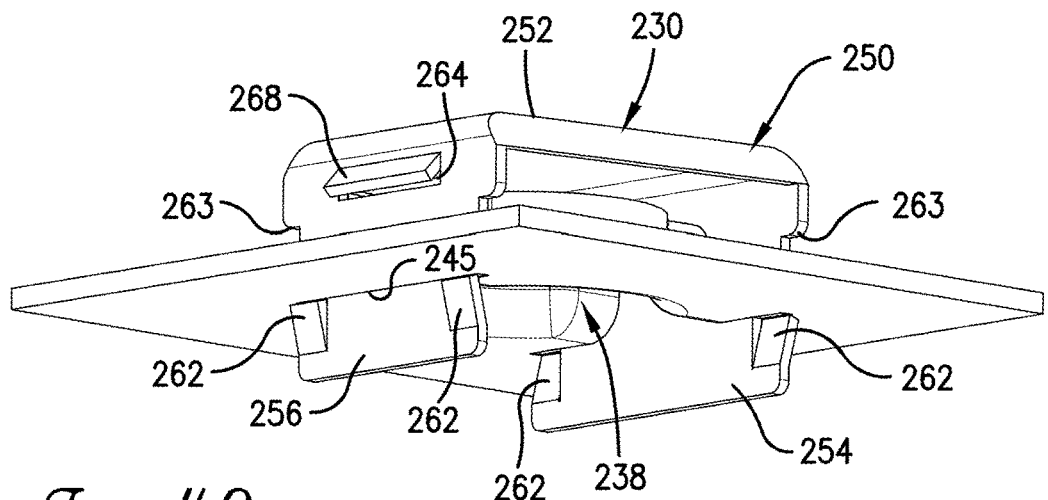
FIG. 49 is a bottom perspective view of the contact tray and the third valve embodiment in an open position.
Figure 50:
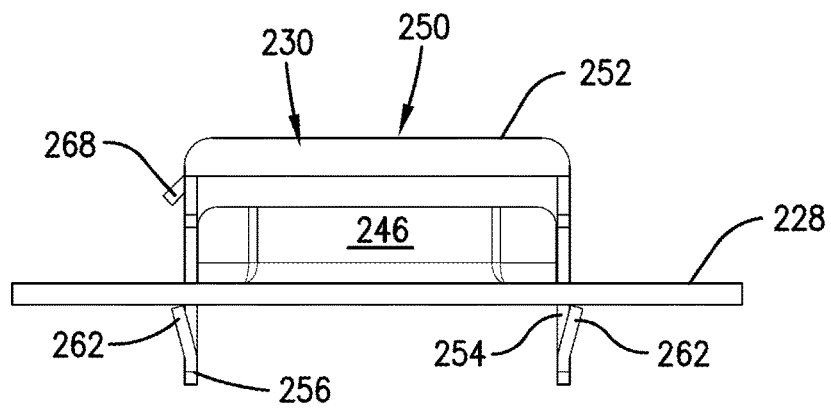
FIG. 50 is a side elevation view of the contact tray and the open valve.
Figure 51:
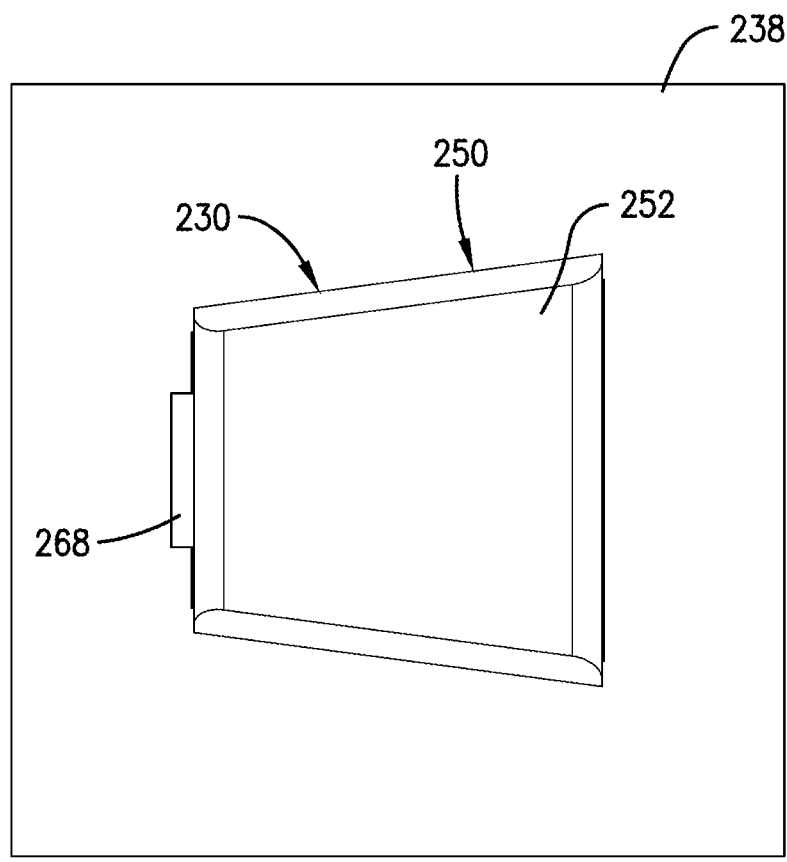
FIG. 51 is a top plan view of the contact tray and the open valve.
Figure 52:
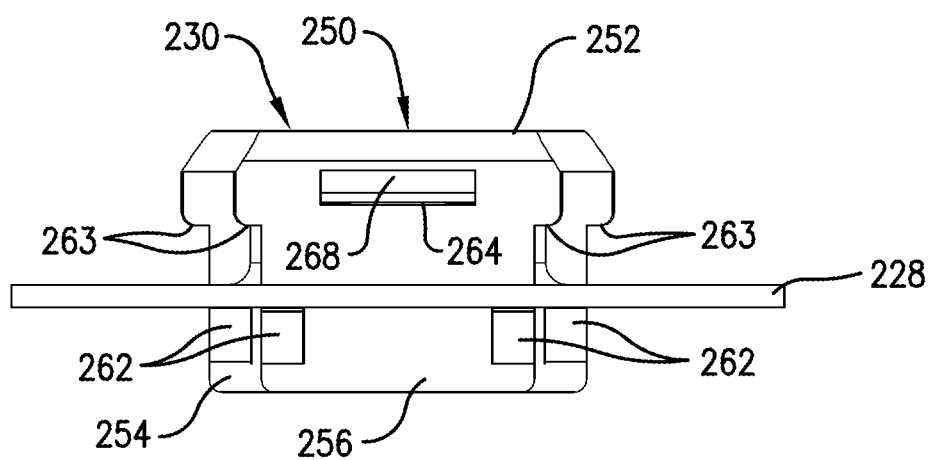
FIG. 52 is a downstream end elevation view of the contact tray and the open valve.
Figure 53:
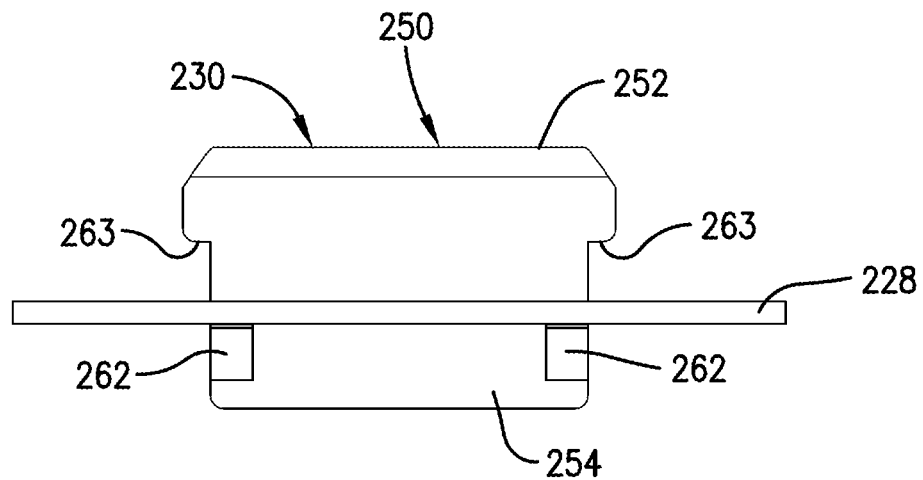
FIG. 53 is an upstream end elevation view of the contact tray and the open valve.
Figure 54:
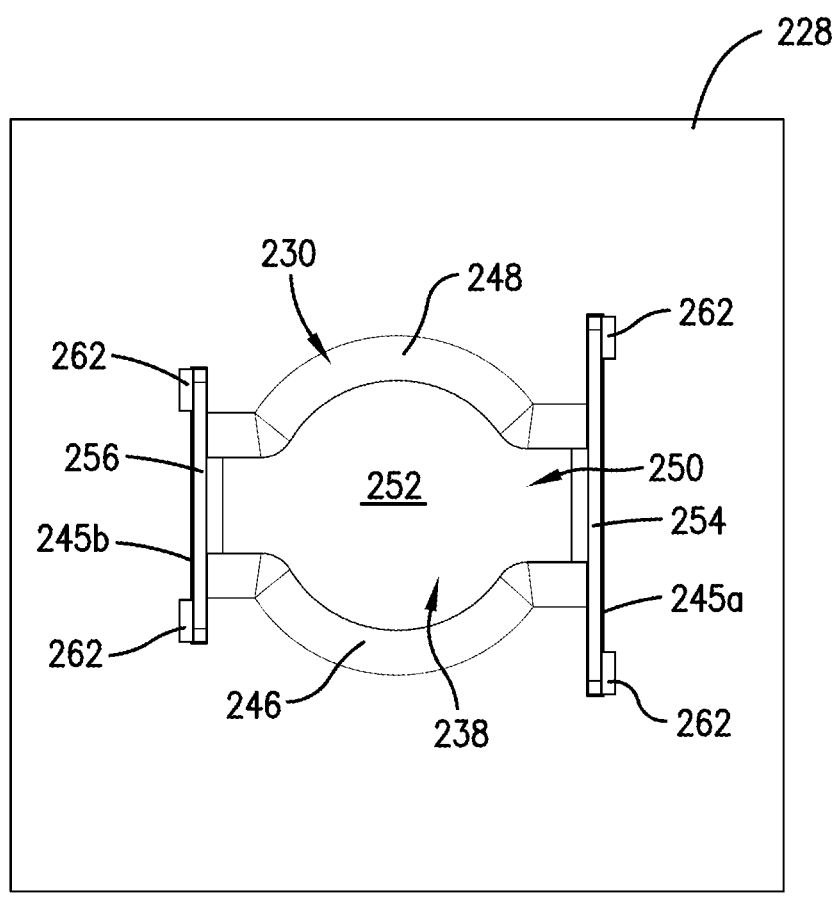
FIG. 54 is a bottom elevation view of the contact tray and the open valve.
Figure 55:
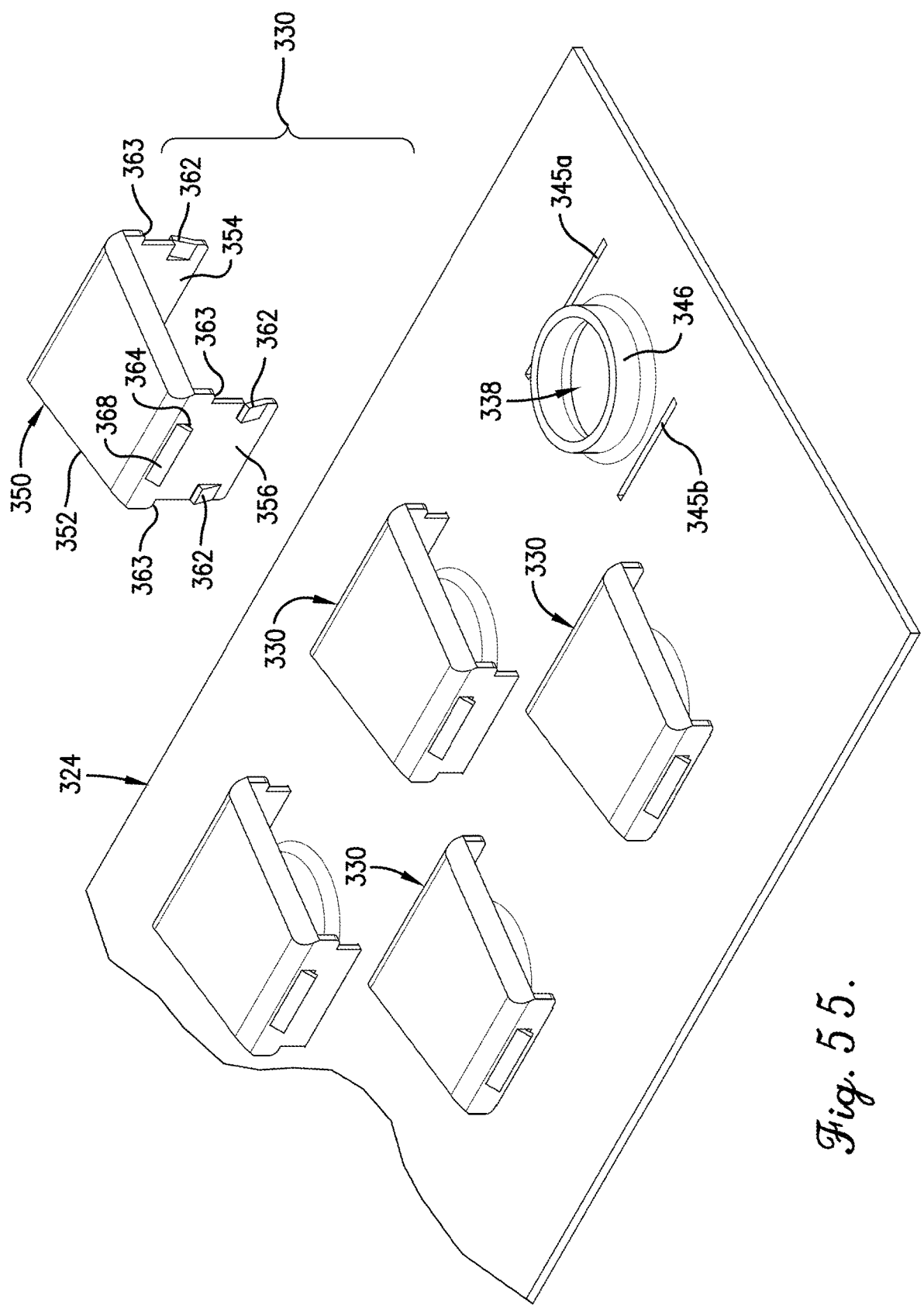
FIG. 55 is a fragmentary, partially-exploded perspective view of a further one of the contact trays having a fourth valve embodiment.
Figure 56:
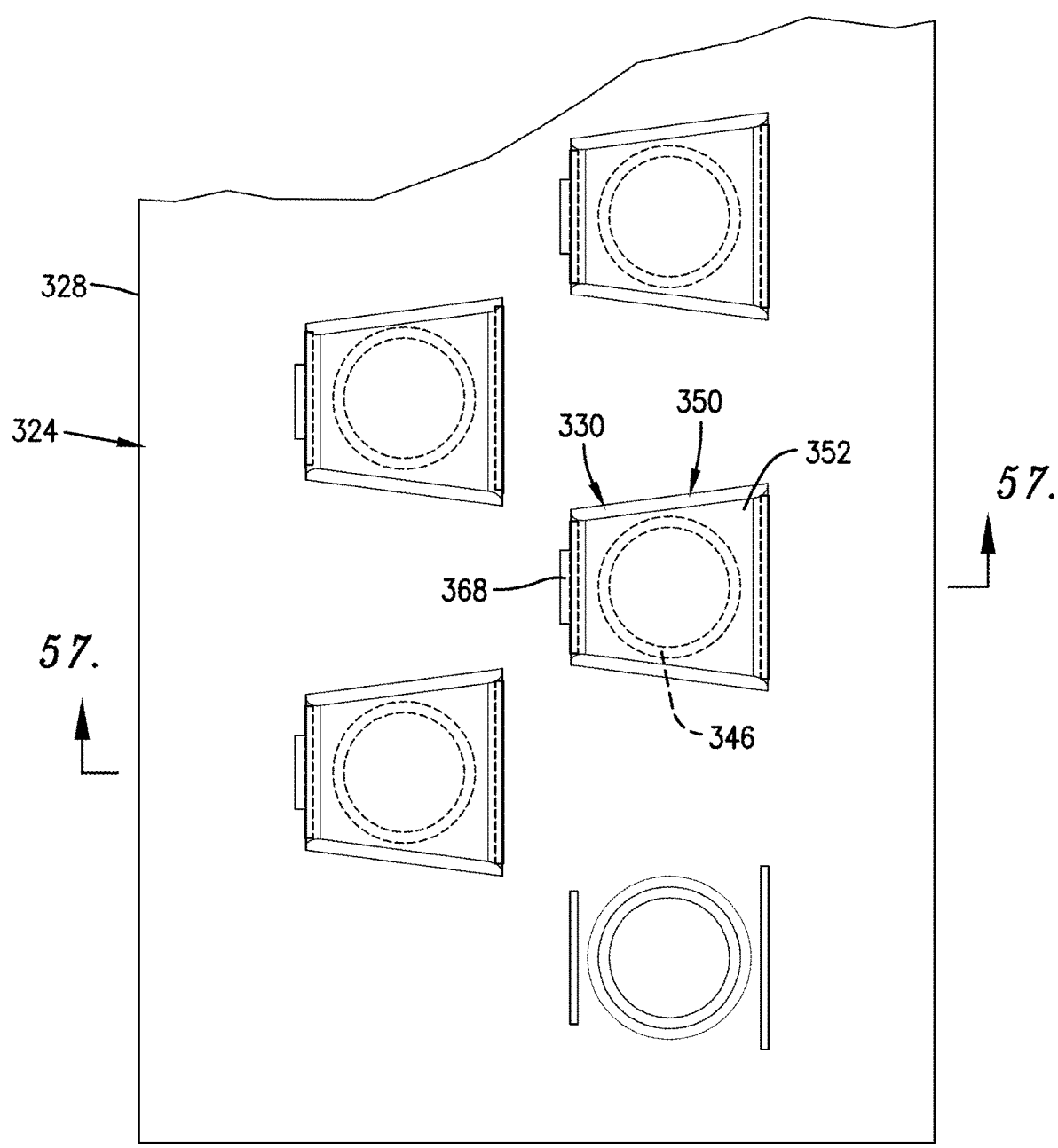
FIG. 56 is a fragmentary top plan view of a portion of the contact tray shown in FIG. 55 with a valve body of one of the valves removed.
Figure 60:
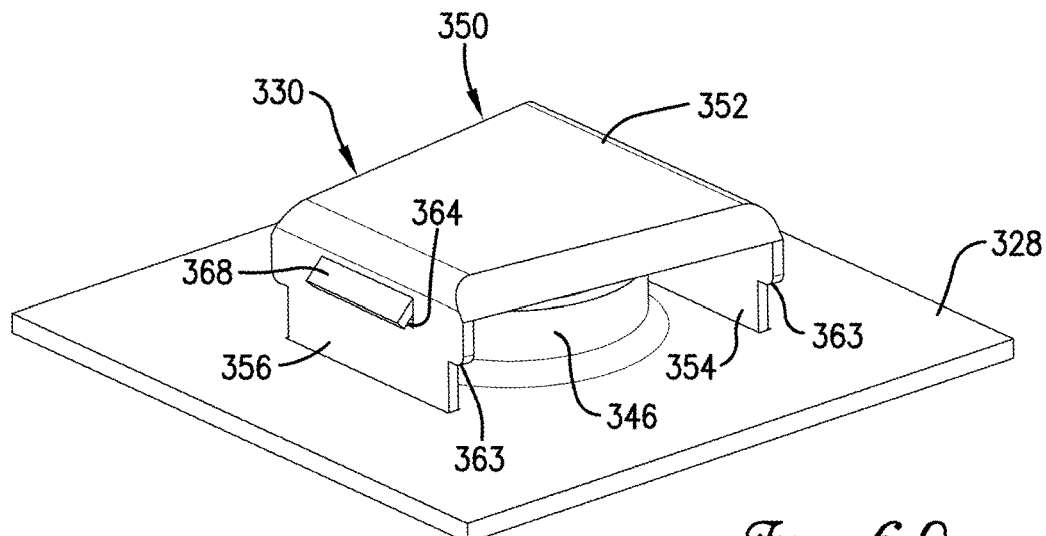
FIG. 60 is a top perspective view of the contact tray and the open valve shown in FIG. 59.
Figure 61:
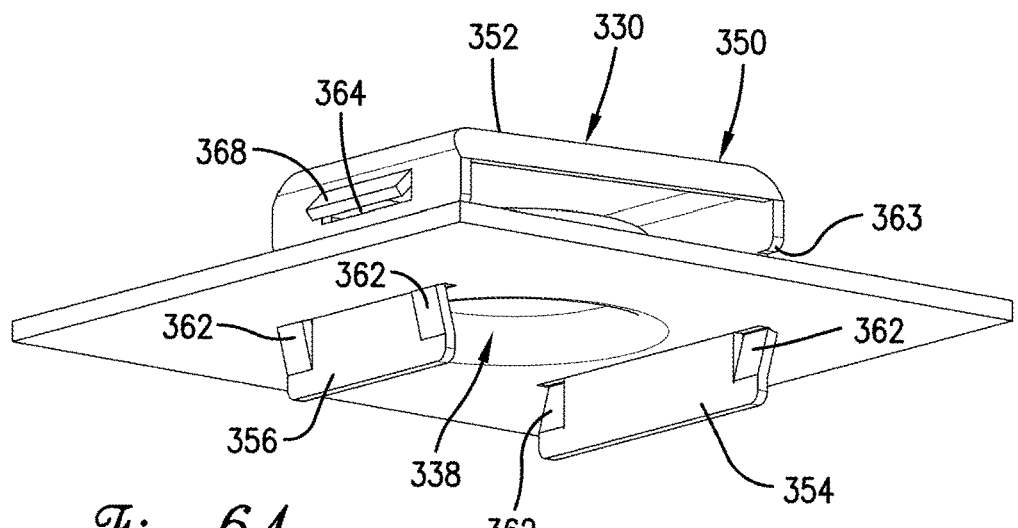
FIG. 61 is a bottom perspective view of the contact tray and the fourth valve embodiment in an open position.
Figure 62:
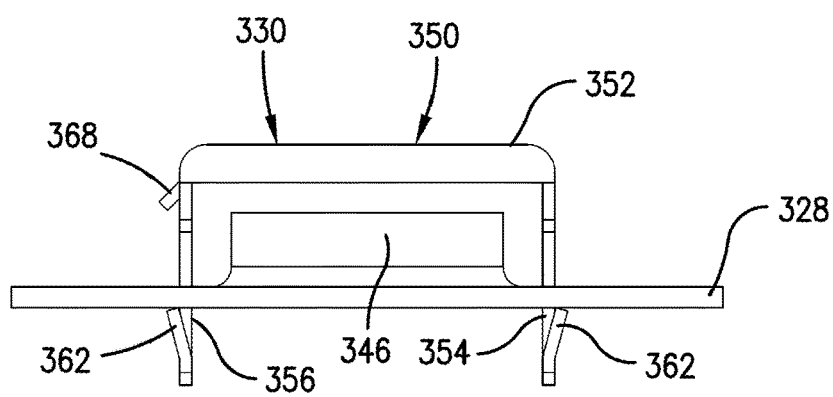
FIG. 62 is a side elevation view of the contact tray and the open valve.
Figure 63:
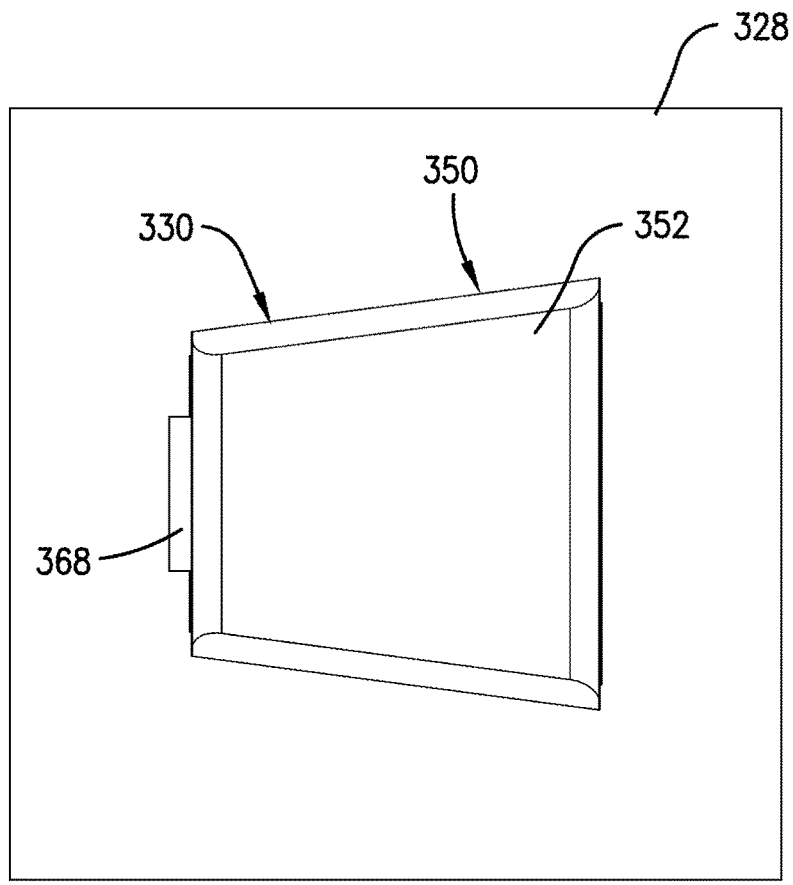
FIG. 63 is a top plan view of the contact tray and the open valve.
Figure 64:
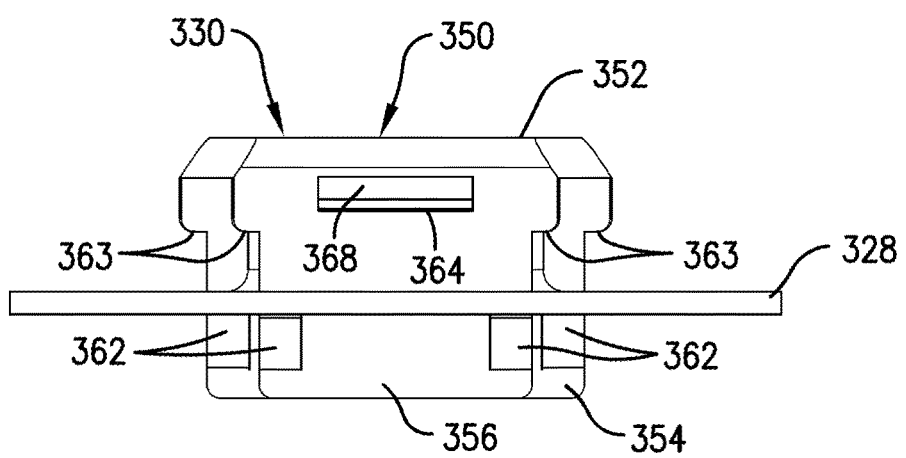
FIG. 64 is a downstream end elevation view of the contact tray and the open valve.
Figure 65:
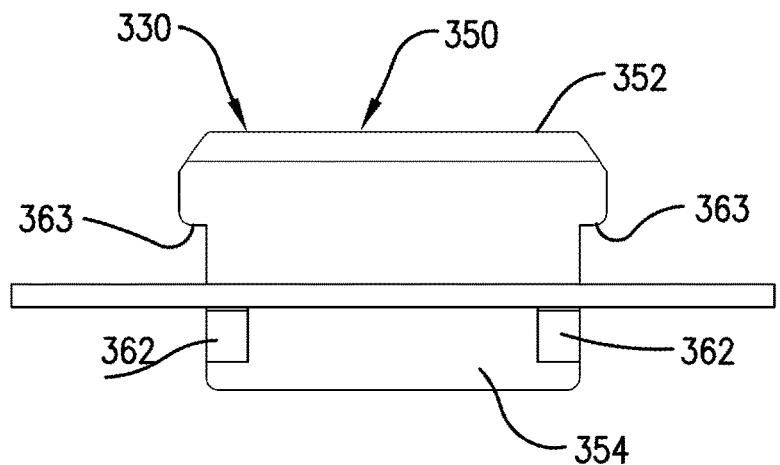
FIG. 65 is an upstream end elevation view of the contact tray and the open valve.
Figure 66:
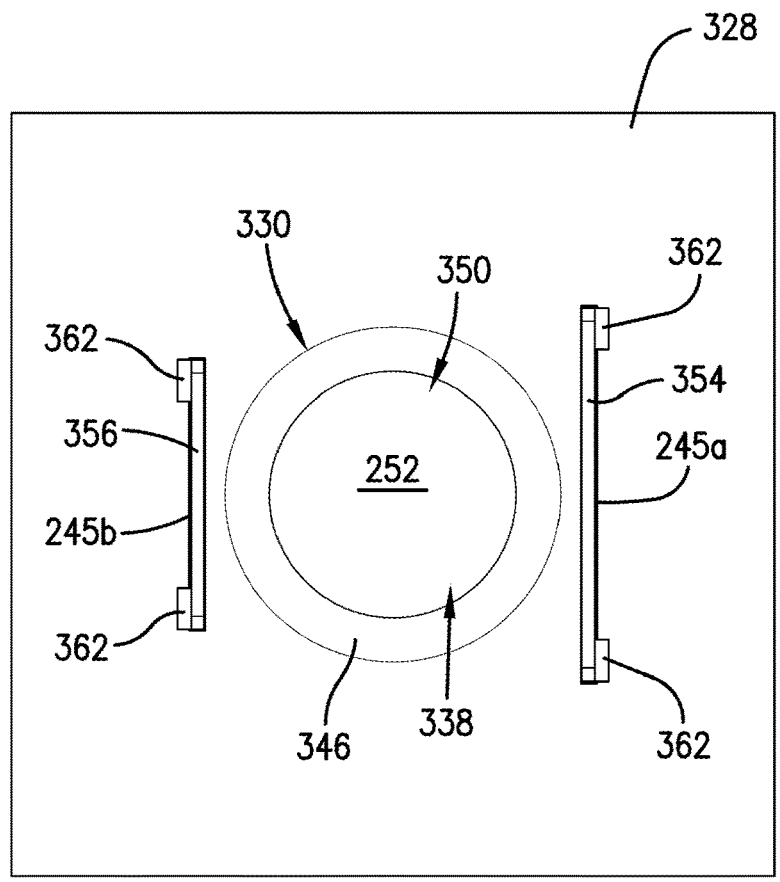
FIG. 66 is a bottom elevation view of the contact tray and the open valve.
Figure 75:
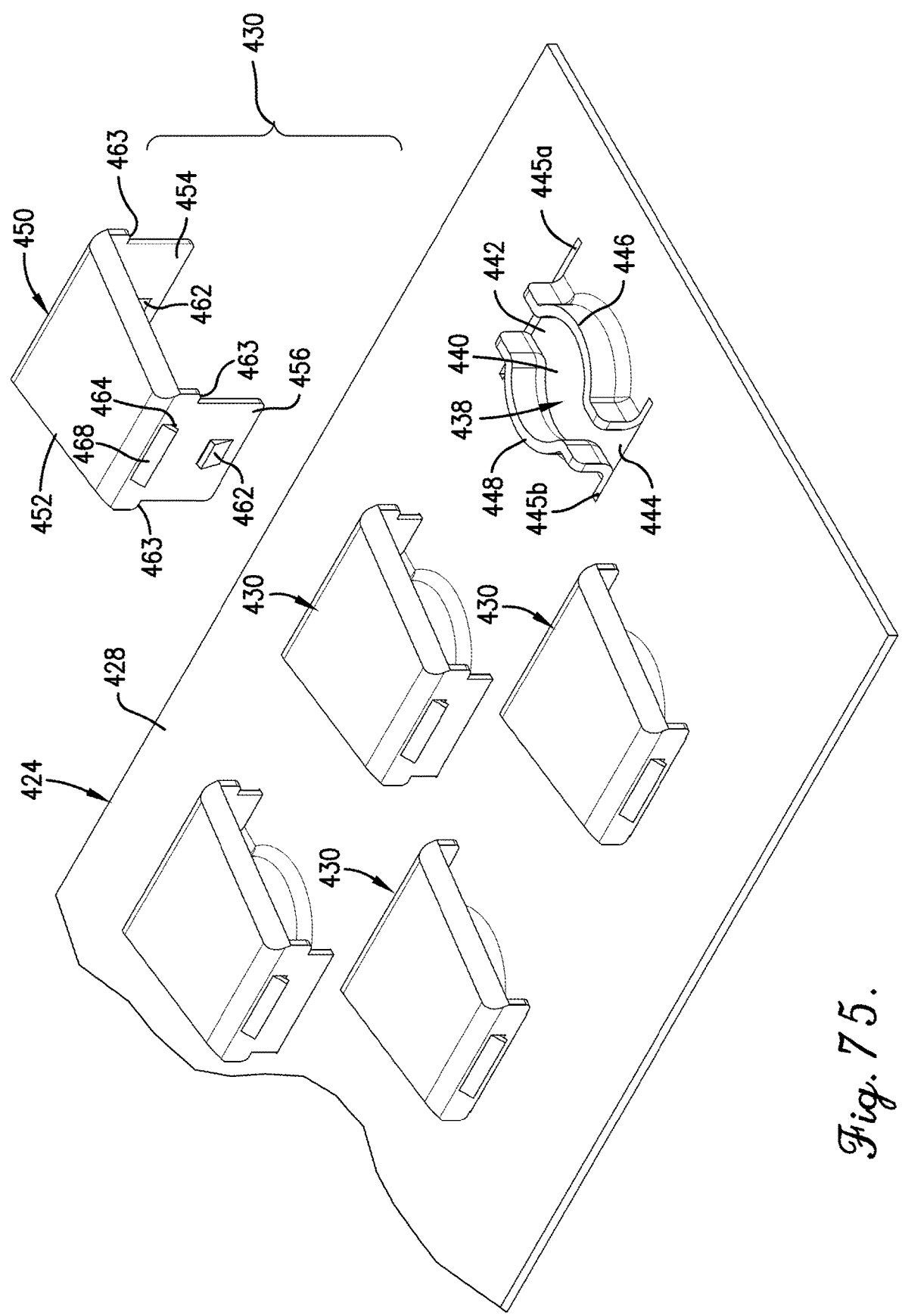
FIG. 75 is a fragmentary, partially-exploded perspective view of a further one of the contact trays having a fifth valve embodiment.
Figure 76:
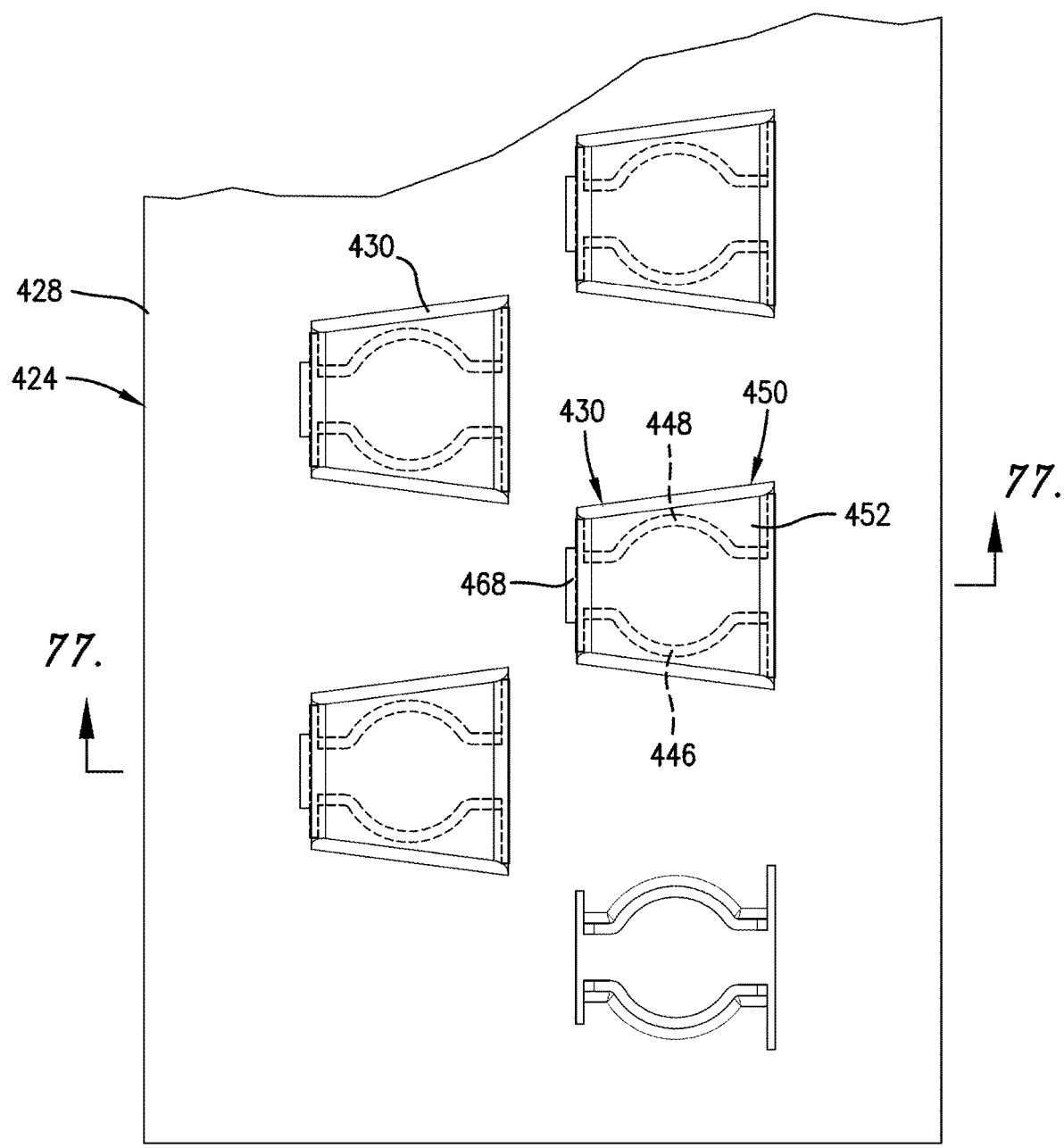
FIG. 76 is a fragmentary top plan view of a portion of the contact tray shown in FIG. 75 with a valve body of one of the valves removed.
Figure 80:
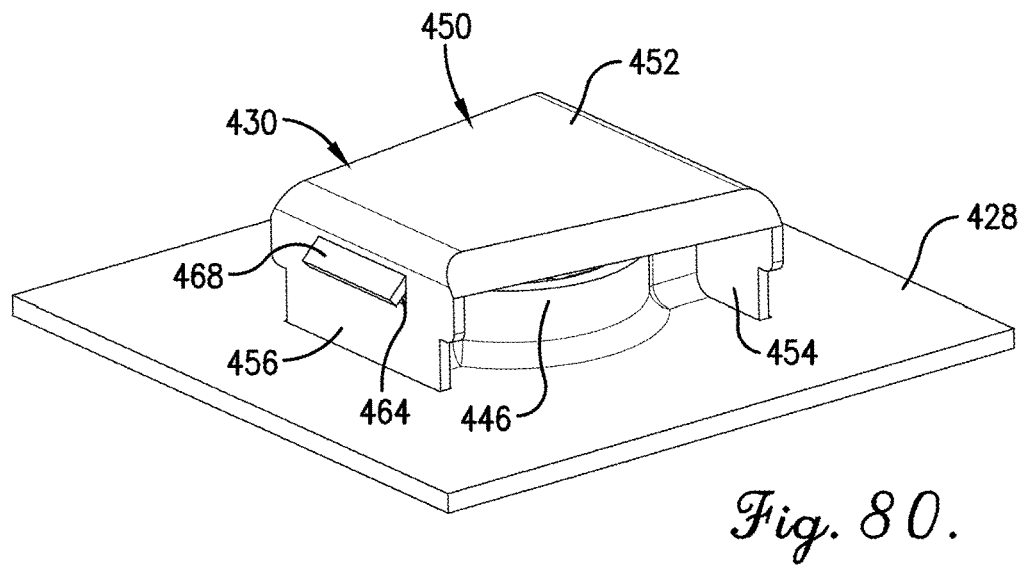
FIG. 80 is a top perspective view of the contact tray and the open valve shown in FIG. 79.
Figure 81:
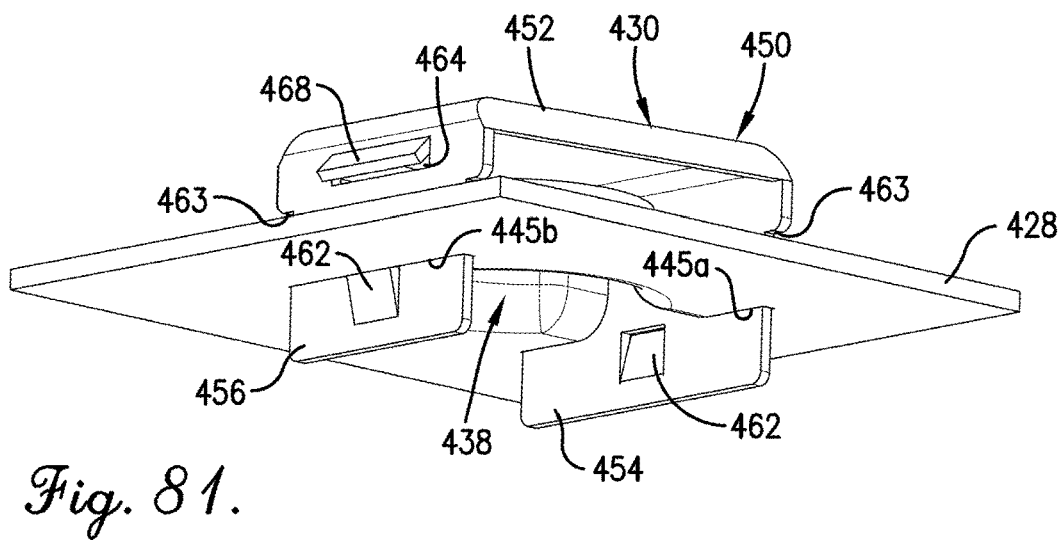
FIG. 81 is a bottom perspective view of the contact tray and the fifth valve embodiment in an open position.
Figure 82:
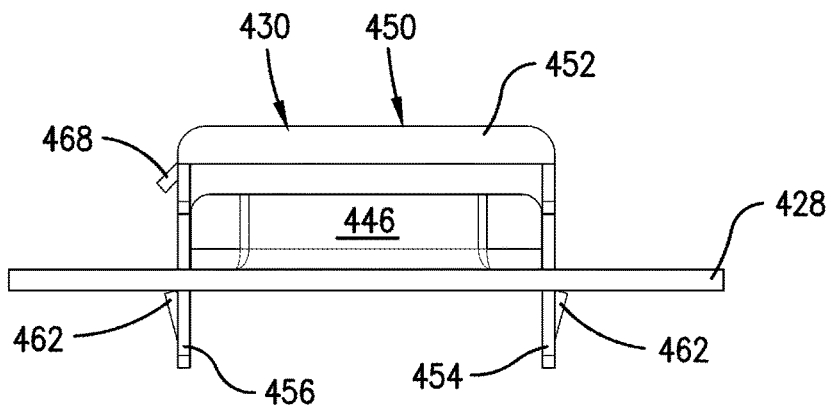
FIG. 82 is a side elevation view of the contact tray and the open valve.
Figure 83:
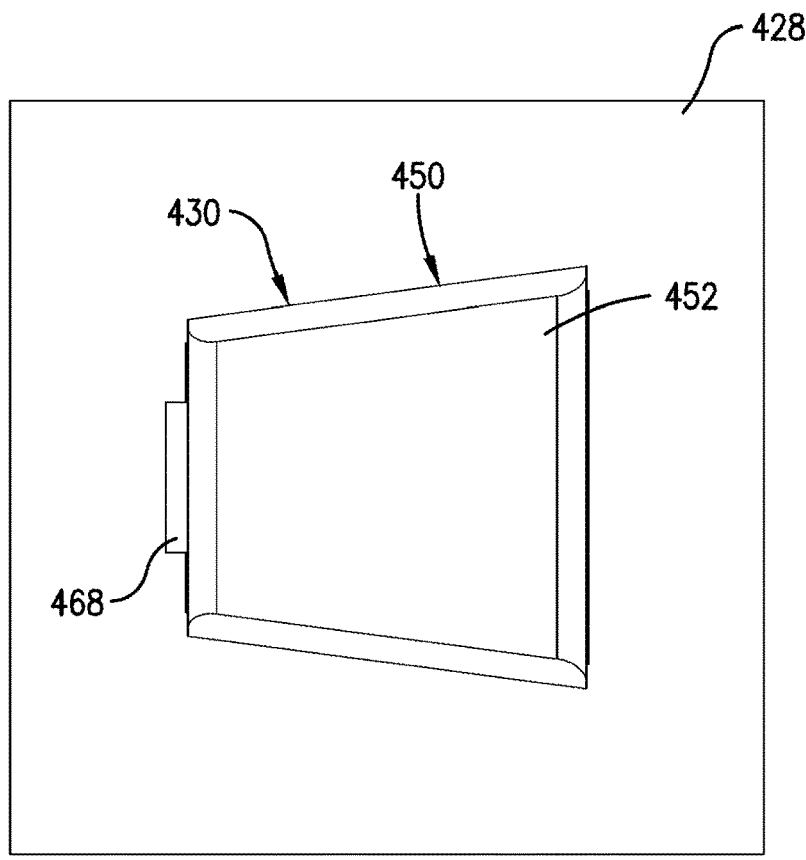
FIG. 83 is a top plan view of the contact tray and the open valve.
Figure 84:
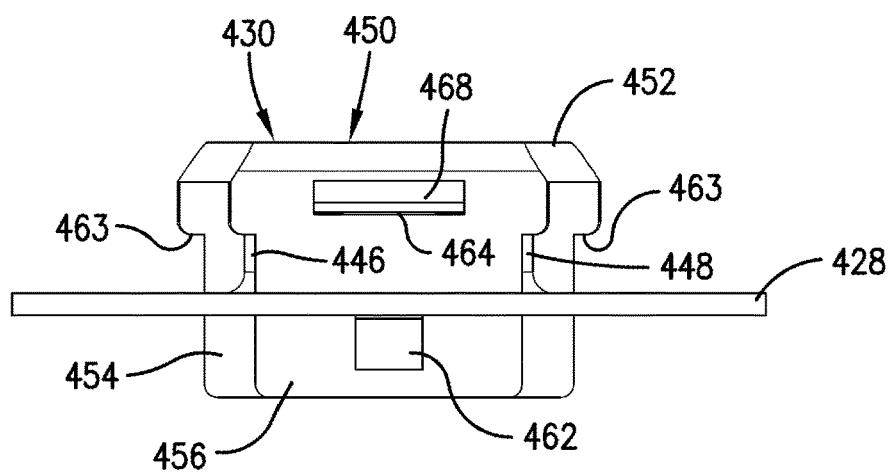
FIG. 84 is a downstream end elevation view of the contact tray and the open valve.
Figure 85:
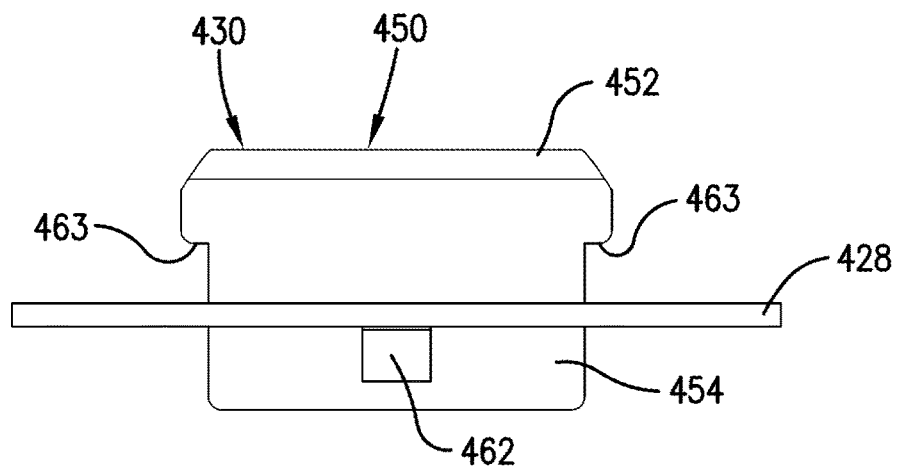
FIG. 85 is an upstream end elevation view of the contact tray and the open valve.
Figure 86:
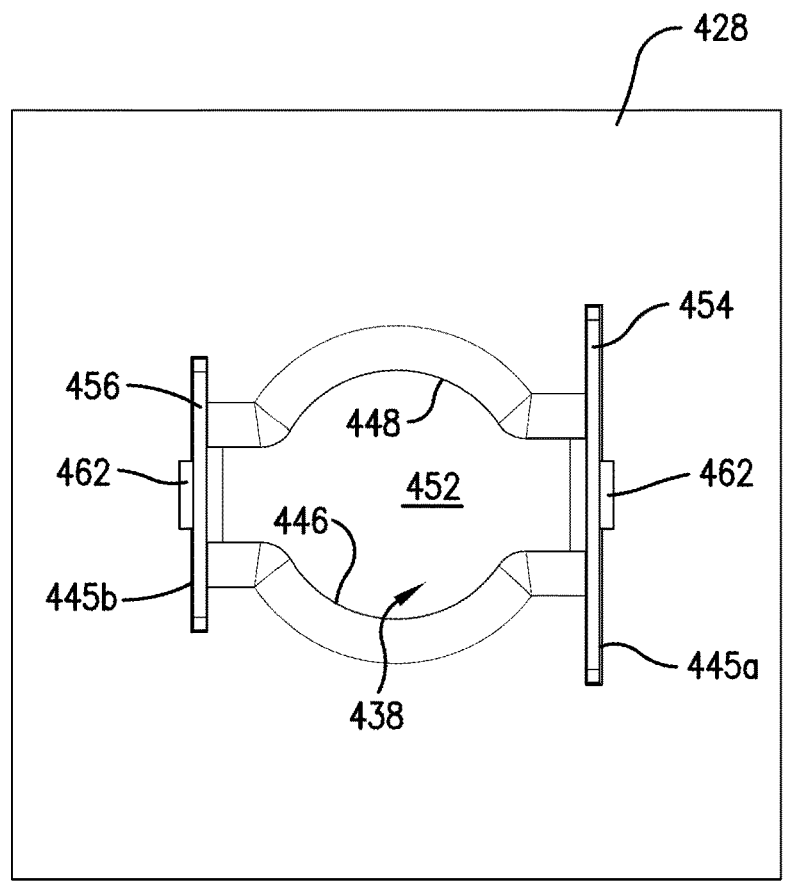
FIG. 86 is a bottom elevation view of the contact tray and the open valve.

Turning now to FIGS. 3-22, each of a first embodiment of the valves 30 on the tray deck 28 comprises an opening 38 that extends through the tray deck 28 to allow for passage of fluid through the tray deck 28 for interaction with the liquid stream when it is received on the tray deck 28. As best seen in FIG. 4, the opening 38 has a central segment 40 as well as two extensions 42 and 44 that extend outwardly from opposite ends of the central segment 40. In one embodiment, the central segment 40 is round and the extensions 42 and 44 are rectangular. The extensions 42 and 44 may each have a greatest width that is less than that of the central segment 40. The extensions 42 and 44 are aligned in the desired flow direction of the liquid stream on the tray deck 28. The extension 42 positioned in the upstream direction may have a greater width than that of the extension 44 positioned in the downstream direction. Other shapes for the central segment 40 and extensions 42 and 44 may be used.

The valves 30 may include wall segments 46 and 48 that extend upwardly along opposite sides of the central segment 40 of the opening 38. The wall segments 46 and 48 may be formed by bending parts of the tray deck 28 upwardly during a punching or other operation that is used to form the openings 38. The wall segments 46 and 48 are curved and follow the circular perimeter of the sides of the central segment 40 between the extensions 42 and 44.

Each valve 30 also includes a valve body 50 that comprises a valve cover 52 and legs 54 and 56. The valve cover 52 has sides that extend outwardly beyond the sides of the opening 38 in the tray deck 28 to more effectively shield the opening 38 against the detrimental downward weeping of fluid through the opening 38. In one embodiment, the sides of the valve cover 52 extend downwardly to guide the flow of vapor ascending through the opening 38 in a lateral direction to facilitate interaction with the liquid stream on the tray deck 28. The sides of the valve cover 52 may be curved or angled downwardly to achieve this guiding function.

The legs 54 and 56 position the valve cover 52 in covering relationship above the opening 38 in the tray deck 28. Two legs 54 and 56 are used in the illustrated embodiment to position the valve cover 52, but additional legs could be used if desired. The legs 54 and 56 are located at opposite ends of the valve cover 50 and extend vertically. The valves 30 are oriented on the tray deck 28 so that the legs 54 and 56 are aligned in the general direction of the desired flow of the liquid stream along the upper surface of the tray deck 28.

The legs 54 and 56 are attached at their upper ends to the valve cover 52 at recesses 58 and 60 that are located at opposite ends of the valve cover 52. The legs 54 and 56 extend downwardly through the extensions 42 and 44 of the opening 38. The legs 54 and 56 and the extensions 42 and 44 are constructed so that the legs 54 and 56 are closely received and vertically moveable within the extensions 42 and 44 to allow the valve cover 52 to move up and down. The valve cover 52 moves vertically between an open position spaced above the opening 38 and, if present, the wall segments 46 and 48 and a closed position resting on or near the tray deck 28 or, if present, the wall segments 46 and 48.

The legs 54 and 56 in one embodiment have a greatest width that is less than that of the valve cover 52. One of the legs 54 or 56 may have a width that is greater than the other one of the legs 54 or 56. For example, the upstream leg 54 may be wider than the downstream leg 56 to facilitate the flow of the liquid stream around the valve 30 and impede entry of liquid into the opening 38.

Each of the legs 54 and 56 has a lower portion that extends below the tray deck 28 and includes at least one stop 62 for contact against an underside of the tray deck 28 to limit the vertical movement of the legs 54 and 56 within the extensions 42 and 44 of the opening 38. In the illustrated embodiment, each of the legs 54 and 56 includes a pair of the stops 62 that are positioned in laterally spaced-apart relationship to each other. The pairs of stops 62 in the legs 54 and 56 have upper ends that are in a common plane that is parallel with the valve cover 52. The lateral spacing and coplanar relationship of the pairs of stops 62 is advantageous in that it helps to maintain the valve body 50 in the correct alignment with the valve cover 52 in a horizontal orientation when the pairs of stops 62 engage against the underside of the tray deck 28. The valve body 50 is thus less likely to become misaligned and stick when it descends in a downward direction in response to a decrease in vapor pressure during fluid processing within the mass transfer column 10.

In one embodiment, the stops 62 are in the form of tabs that are bent outwardly from the plane of the legs 54 and 56. The stops 62 are constructed to prevent removal of the legs 54 and 56 from within the extensions 42 and 44 of the opening 38 during the operation of the mass transfer column and to allow the legs 54 and 56 to be inserted into the extensions 42 and 44 during assembly of the valves 30 by exerting a force on the lower portions of the legs 54 and 56 to move them toward each other a sufficient distance to allow the stops 62 to pass through the extensions 42 and 44. Upon release of the force, the legs 54 and 56 move back to their original position extending in parallel relationship to each other to seat the valve body 50 within the opening 38.

The valves 30 further include deflectors 64 and 66 that are positioned adjacent opposite sides of each one of the legs 54 and 56. The deflectors 64 and 66 are positioned outwardly of the legs 54 and 56 so that they extend outwardly beyond and laterally of the extensions 42 and 44 of the underlying opening 38 in the tray deck 28. The deflectors 64 and 66 also extend downwardly below the sides of the valve cover 52 to restrict vapor passage around the legs 54 and 56 as it ascends through the opening 38 in the tray deck 28. In one embodiment, the deflectors 64 and 66 are formed as downward extensions of the valve cover 52 and are positioned at the ends of the valve cover 52 adjacent the recesses where the legs 54 and 56 are joined to the valve cover 52. The deflectors 64 and 66 may extend downwardly a sufficient distance to engage against an upper surface of the tray deck 28 when the valve 30 is in the closed position.

A second embodiment of the valves is shown in FIGS. 23-42 and is designated by the number 130. Valves 130 are similar to the valves 30 shown in FIGS. 1-22 and like reference numerals with the prefix "1" have been used to designate the parts of the valves 130 that are similar to the corresponding parts in the valves 30 of the first embodiment. The main difference between valves 130 and valves 30 is only a single stop 162 is used in the legs 154 and 156 of the valves 130 and it is centrally positioned between the sides of the legs 154 or 156.

A third embodiment of the valves is shown in FIGS. 43-54 and is designated by the number 230. The valves 230 are positioned on a tray deck 228 and each valve 230 comprises an opening 238 that extends through the tray deck 228 to allow for passage of fluid through the tray deck 228 for interaction with the liquid stream when it is received on the tray deck 228. As best seen in FIG. 43, the opening 238 has a central segment 240 as well as two extensions 242 and 244 that extend outwardly from opposite ends of the central segment 240 and terminate in transversely-extending slots 245a and 245b. In one embodiment, the central segment 240 is round and the extensions 242 and 244 have a rectangular segment leading to the narrow transverse slots 245a and 245b. The rectangular segments of the extensions 242 and 244 may each have a greatest width that is less than that of the central segment 240 and the slots 245a and 245b may each have a width that is greater than that of the central segment 240. The extensions 242 and 244 are aligned in the desired flow direction of the liquid stream on the tray deck 228. The extension 242 and its slot 245a that are positioned in the upstream direction may have a greater width than that of the extension 244 and its slot 245b that are positioned in the downstream direction. Other shapes for the central segment 240 and the extensions 242 and 244 may be used.

The valves 230 may include wall segments 246 and 248 that extend upwardly along opposite sides of the central segment 240 of the opening 238 and the rectangular segments of the extensions 242 and 244. The wall segments 246 and 248 may be formed by bending parts of the tray deck 228 upwardly during a punching or other operation that is used to form the openings 38. The wall segments 246 and 248 are curved as the follow the circular perimeter of the sides of the central segment 240 and are general linear as they follow along the sides of the rectangular segment of the extensions 242 and 244.

Each valve 230 also includes a valve body 250 that comprises a valve cover 252 and legs 254 and 256. The valve cover 252 is generally planar and may have a polygonal configuration, such as the illustrated trapezoidal configuration. The valve cover 252 is sized so that its sides and ends extend outwardly beyond the sides and ends of the central segment 240 and the extensions 242 and 244 of the opening 238 in the tray deck 228 to more effectively shield the opening 238 against the detrimental downward weeping of fluid through the opening 238. In one embodiment, the sides and ends of the valve cover 252 extend downwardly with the sides guiding the flow of vapor ascending through the opening 238 in a lateral direction to the overall direction of flow of the liquid stream on the tray deck 228 to facilitate interaction with the liquid stream on the tray deck 228. The sides of the valve cover 252 may be curved or angled downwardly to achieve this guiding function.

The legs 254 and 256 position the valve cover 252 in covering relationship above the opening 238 and the extensions 242 and 244 in the tray deck 228. Two legs 254 and 256 are used in the illustrated embodiment to position the valve cover 252, but additional legs could be used if desired. The legs 254 and 256 are located at opposite ends of the valve cover 250 and extend vertically. The valves 230 are oriented on the tray deck 228 so that the legs 54 and 56 are aligned in the general direction of the desired overall flow of the liquid stream along the upper surface of the tray deck 228.

The legs 254 and 256 are attached at their upper ends to the valve cover 252 to the opposite ends of the valve cover 252. The legs 254 and 256 extend downwardly through the slots 245a and 245b that communicate with the extensions 42 and 44 and the opening 38. The legs 254 and 256 and the slots 245a and 245b are constructed so that the legs 254 and 256 are closely received and vertically moveable within the slots 245a and 245b to allow the valve cover 252 to move up and down. The valve cover 252 moves vertically between an open position spaced above the opening 238 and, if present, the wall segments 246 and 248 and a closed position resting on or near the tray deck 228 or, if present, the wall segments 246 and 248.

The legs 254 and 256 in one embodiment have a greatest width corresponding to the width of the corresponding end of the valve cover 252. One of the legs 254 or 256 may have a width that is greater than the other one of the legs 254 or 256. For example, the upstream leg 254 may be wider than the downstream leg 256 to facilitate the flow of the liquid stream around the valve 230 and impede entry of liquid into the opening 238.

Each of the legs 254 and 256 has a lower portion that extends below the tray deck 228 and includes at least one stop 262 for contact against an underside of the tray deck 228 to limit the vertical movement of the legs 254 and 256 within the slots 245a and 245b in the extensions 242 and 244 of the opening 238. In the illustrated embodiment, each of the legs 254 and 256 includes a pair of the stops 262 that are positioned in laterally spaced-apart relationship to each other. The pairs of stops 262 in the legs 254 and 256 have upper ends that are in a common plane that is parallel with the valve cover 252. The lateral spacing and coplanar relationship of the pairs of stops 262 is advantageous in that it helps to maintain the valve body 250 in the correct alignment with the valve cover 252 in a horizontal orientation when the pairs of stops 262 engage against the underside of the tray deck 228. The valve body 250 is thus less likely to become misaligned and stick when it descends in a downward direction in response to a decrease in vapor pressure during fluid processing within the mass transfer column 10.

In one embodiment, the stops 262 are in the form of tabs that are bent outwardly from the plane of the legs 254 and 256. The stops 262 are constructed to prevent removal of the legs 254 and 256 from within the extensions 242 and 244 of the opening 238 during the operation of the mass transfer column 10. During assembly of the valves 230, the legs 254 and 256 may be inserted into the slots 245a and 245b before the stops 262 are formed by bending of the tabs.

The stops 262 set the upper limit of the vertical movement of the valve body 250 in response to vapor pressure against an underside of the valve cover 252. The lower limit of the vertical movement of the valve body 250 may be set by the contact of the underside of the valve cover 252 on the top of the wall segments 246 and 248, if present, or by the contact of shoulders 263 formed on the legs 254 and 256 against an upper surface of the tray deck 228.

The downstream leg 256 in each valve body 250 may include one or more vents 264 positioned to allow a portion of the vapor that ascends through the opening 238 in the tray deck 228 to pass through the downstream leg 256 and facilitate the directional flow of the liquid stream and vapor mixture or froth in the downstream direction. An overlying deflector 268 may be associated with the vent 264 to direct the vapor passing through the vent 264 in a downward direction toward the tray deck 228 to enhance the mixing of the vapor with the liquid stream.

A fourth embodiment of the valves is designated by the number 330 in FIGS. 55-74, in which like reference numbers with the prefix "3" have been used to designate parts of the valves 330 that are the same or similar to the corresponding parts of the valves 230. Valves 330 are the same as the valves 230 shown in FIGS. 23-42 except the opening 338 does not include the extensions 242 and 244 that are used with the opening 238. Instead, the slots 345a and 345b in the tray deck 328 through which the legs 354 and 356 extend are not connected to the opening 238 and a single wall 346 surrounds the opening.

A fifth embodiment of the valves is designated by the number 430 in FIGS. 75-94, in which like reference numbers with the prefix "4" are used to designate parts of the valves that are the same or similar to the corresponding parts of the valves 230. Valves 430 are the same as valves 230, except that only a single stop 162 is used in the legs 454 and 456 of the valves 430 and it is centrally positioned between the sides of the legs 454 or 456.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A contact tray for use in a mass transfer column, said contact tray comprising:
   a tray deck for receiving a liquid stream; and
   a plurality of valves distributed across the tray deck, each of said valves comprising:
   an opening in the tray deck to allow for passage of vapor through the tray deck for interaction with the liquid stream when it is received on the tray deck, said opening having a central segment and extensions that extend outwardly from opposite ends of the central segment and include transversely-extending slots, wherein the extensions excluding the slots have a greatest transverse width that is less than that of the central segment;
   wall segments that extend upwardly along opposite sides of the central segment of the opening; and
   a valve body comprising a trapezoidal valve cover positioned in covering relationship above said opening and extensions and having legs that are attached to the valve cover at opposite ends of the valve cover and extend downwardly through said slots in the extensions of the opening,
   wherein said valve cover has sides that extend outwardly beyond the sides of the central segment and the extensions of the opening.

2. The contract tray as set forth in claim 1, wherein each of said legs has a lower portion that extends below said tray deck and includes a stop for contact against said tray deck to limit said vertical movement of the legs within said slots in the extensions of the opening.

3. The contact tray as set forth in claim 2, wherein the lower portion of at least one of said legs includes a pair of said stops positioned in laterally spaced-apart relationship to each other.

4. The contact tray as set forth in claim 2, wherein the sides of the valve cover extend downwardly.

5. The contact tray as set forth in claim 4, including a vent positioned in one of said legs to allow passage of vapor through said one leg after the vapor passes through the opening.

6. A contact tray for use in a mass transfer column, said contact tray comprising:
  a tray deck for receiving a liquid stream; and
  a plurality of valves distributed across the tray deck, each of said valves comprising:
    an opening in the tray deck to allow for passage of vapor through the tray deck for interaction with the liquid stream when it is received on the tray deck, said opening having a central segment and extensions that extend outwardly from opposite ends of the central segment and include transversely-extending slots;
    wall segments that extend upwardly along opposite sides of the central segment of the opening; and
    a valve body comprising:
      a trapezoidal valve cover positioned in covering relationship above said opening and extensions, said valve cover having sides that extend outwardly beyond the sides of the central segment and the extensions of the opening;
      legs that are attached to the valve cover at opposite ends of the valve cover and extend downwardly through said slots in the extensions of the opening, each of said legs having a lower portion that extends below said tray deck and includes a stop for contact against said tray deck to limit said vertical movement of the legs within said slots in the extensions of the opening; and
      a vent positioned in one of said legs to allow passage of vapor through said one leg after the vapor passes through the opening.

7. The contact tray as set forth in claim 6, wherein the sides of the valve cover extend downwardly.

8. The contact tray as set forth in claim 6, wherein the lower portion of at least one of said legs includes a pair of said stops positioned in laterally spaced-apart relationship to each other.

9. The contact tray as set forth in claim 8, including a vent positioned in one of said legs to allow passage of vapor through said one leg after the vapor passes through the opening.

10. A contact tray for use in a mass transfer column, said contact tray comprising:
  a tray deck for receiving a liquid stream; and
  a plurality of valves distributed across the tray deck, each of said valves comprising:
    an opening in the tray deck to allow for passage of vapor through the tray deck for interaction with the liquid stream when it is received on the tray deck, said opening having a central segment and extensions that extend outwardly from opposite ends of the central segment and include transversely-extending slots;
    wall segments that extend upwardly along opposite sides of the central segment of the opening; and
    a valve body comprising:
      a trapezoidal valve cover positioned in covering relationship above said opening and extensions, said valve cover having sides that extend downwardly and outwardly beyond the sides of the central segment and the extensions of the opening;
      legs that are attached to the valve cover at opposite ends of the valve cover and extend downwardly through said slots in the extensions of the opening; and
      a vent positioned in one of said legs to allow passage of vapor through said one leg after the vapor passes through the opening.

11. The contact tray as set forth in claim 10, wherein each of said legs has a lower portion that extends below said tray deck and includes a stop for contact against said tray deck to limit said vertical movement of the legs within said slots in the extensions of the opening.

12. The contact tray as set forth in claim 11, wherein the lower portion of at least one of said legs includes a pair of said stops positioned in laterally spaced-apart relationship to each other.

* * * * *